United States Patent [19]
Von Gal, Jr. et al.

[11] 3,732,991
[45] May 15, 1973

[54] STACKING MACHINE

[75] Inventors: George E. Von Gal, Jr.; Lawrence H. Hutchinson; Oneal W. Davis, all of Montgomery, Ala.

[73] Assignee: Litton Industries, Inc., Beverly Hills, Calif.

[22] Filed: Apr. 24, 1970

[21] Appl. No.: 43,294

Related U.S. Application Data

[60] Division of Ser. No. 775,965, Nov. 14, 1968, Pat. No. 3,521,736, which is a continuation of Ser. No. 557,285, June 13, 1966, abandoned.

[52] U.S. Cl. ................................................214/6 P
[51] Int. Cl. .................................................B65g 57/24
[58] Field of Search ................214/6 P, 6 DK, 6 H; 198/33 AB

[56] References Cited

UNITED STATES PATENTS

| | | | |
|---|---|---|---|
| 2,699,264 | 1/1955 | Bruce et al. | 214/6 P |
| 2,796,179 | 6/1957 | Van Vleck | 214/6 H |
| 2,946,465 | 7/1960 | Raynor | 214/6 P |
| 2,947,405 | 8/1960 | Fenton | 214/P X |
| 3,086,640 | 4/1963 | Verrinder | 198/33 AB |
| 3,247,981 | 4/1966 | Johnson | 214/6 P |
| 3,278,048 | 10/1966 | Bruce | 214/6 P |
| 3,329,286 | 7/1967 | Kurczak | 214/6 P |

*Primary Examiner*—Robert J. Spar
*Attorney*—Morris I. Pollack & Alan C. Rose

[57] ABSTRACT

A stacking maching including an infeed conveyor, a cross-feed conveyor angularly disposed with respect to the infeed conveyor, and a turning section at the junction of the infeed conveyor and the corss-feed conveyor for selectively turning articles passing from the infeed conveyor to the cross-feed conveyor for sidewise or endwise movement along the cross-feed conveyor. A rake mechanism removes the articles from the cross-feed conveyor onto a selectively extendible apron assembly adjacent the cross-feed conveyor, which selectively moves the articles into an elevator shaft. A compression and release assembly engages and retains the articles on the apron assembly within the elevator shaft while the apron assembly is retracted from under the articles thus held. The compression and release assembly then releases the article in the elevator shaft and allows them to drop onto a pallet held within the elevator shaft by a vertically movable elevator. The elevator lowers the pallet and articles for receipt of more articles from the apron assembly. After a pre-determined number of layers of articles have been placed on the pallet, the elevator lowers and discharges the loaded pallet from the machine, receives an empty pallet thereon and raises the same for the receipt of articles thereon. The operation of the machine is controlled by a punched tape control mechanism. The control mechanism is actuated by a sensing means which electrically counts the number of articles moving into the machine.

3 Claims, 23 Drawing Figures

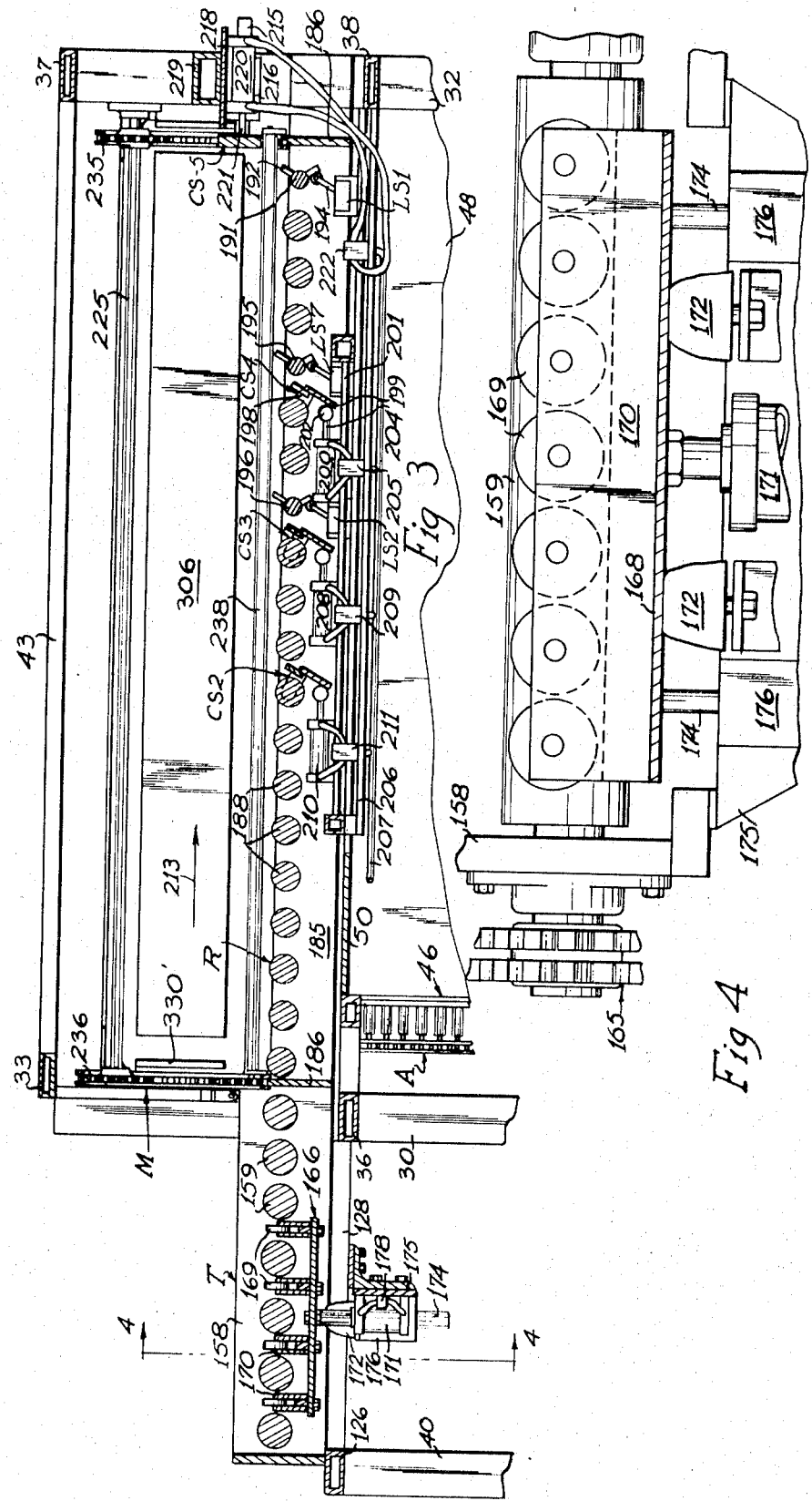

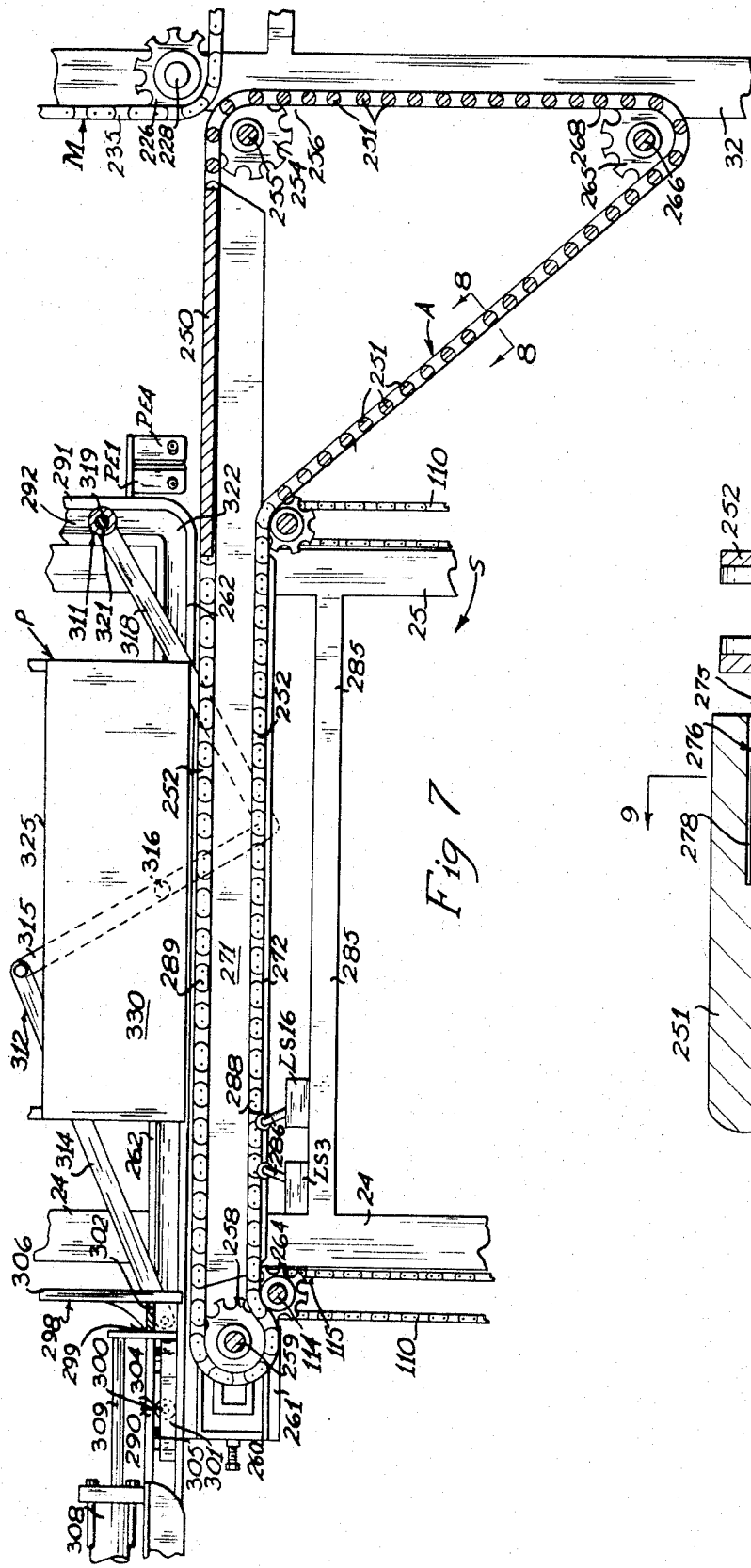
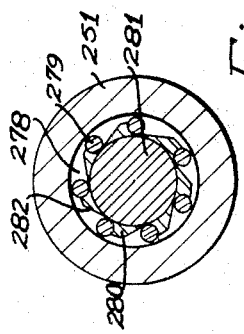
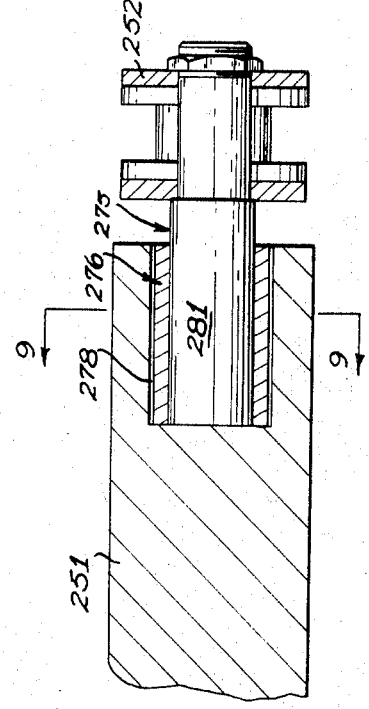

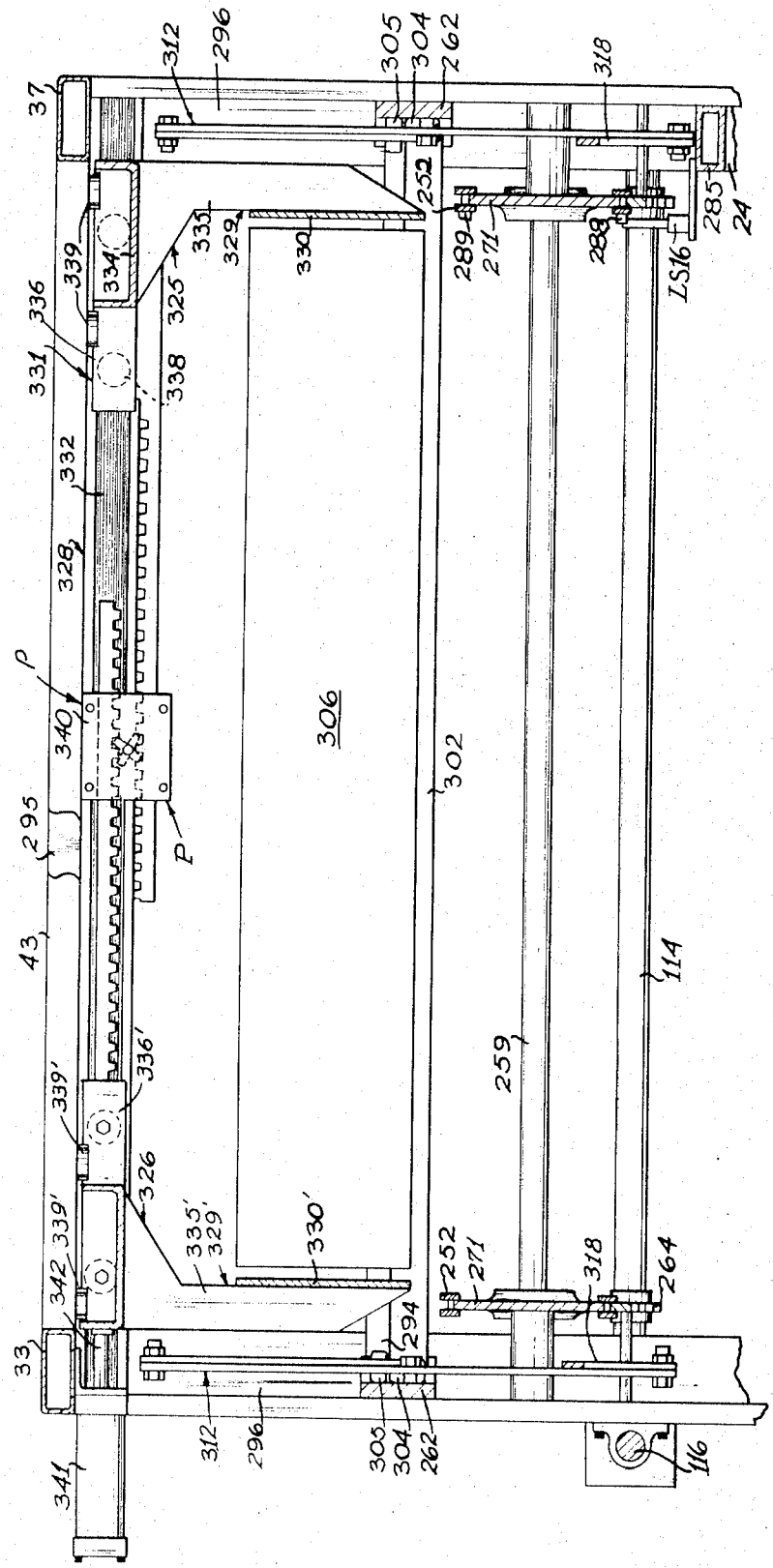

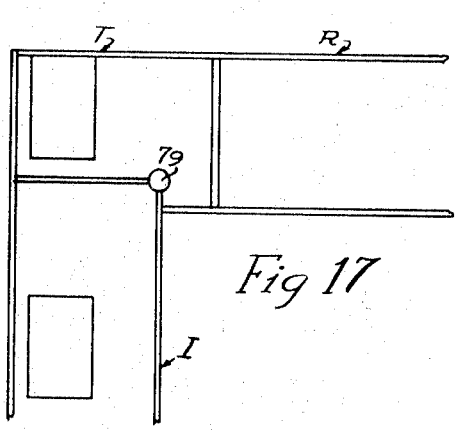
Fig 17
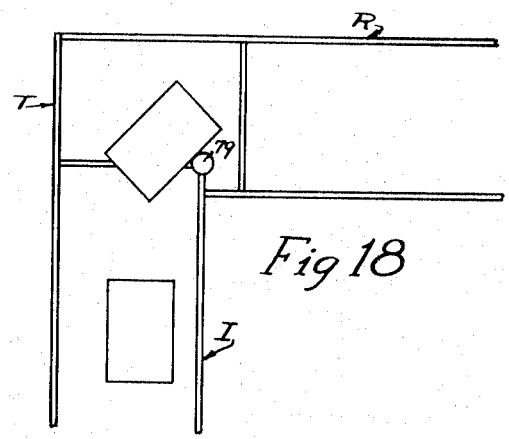
Fig 18
Fig 19
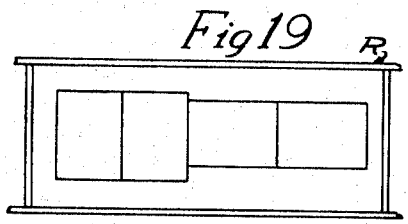
Fig 20
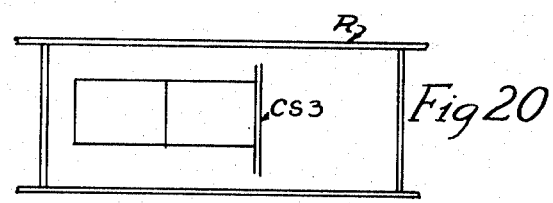
Fig 21
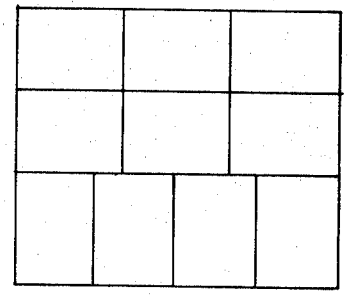
Fig 22
Fig 23

STACKING MACHINE

This application is a divisional application of our co-pending application Ser. No. 775,965, filed Nov. 14, 1968 now U.S. Pat. No. 3,521,736, which, in turn, is a Streamlined Continuation of application Ser. No. 557,285, filed June 13, 1966, now abandoned.

This invention relates to stacking machines and more particularly to stacking machines which will receive, orient and automatically stack articles such as cartons and cases on pallets or other receiving means.

In the past, many devices have been proposed and built for the purpose of stacking articles one on top of the other for storage and shipment. Since it is also desirable that the cartons or cases be oriented as they are stacked so as to most effectively utilize the available space on a pallet or other receiving means, prior art stacking machines have also provided means for such orientation. However, these prior art stacking machines have been extremely expensive and complicated, which resulted in effectively precluding small manufacturers from utilizing the same since the cost of installation and maintenance has been prohibitive for their operating budgets. Moreover, prior art devices which orient the cartons or cases as they are stacked have usually had such a slow rate of operation that several similar machines had to be utilized in order that the stacking rate match the discharge rate from an assembly line.

In an attempt to obviate these problems in the prior art and to provide an inexpensive yet effective stacking machine, our device is a stacking machine including a conveyor which properly orients and delivers the articles to be stacked to a ram or rake mechanism which, upon receiving a predetermined number of these oriented articles, will be automatically actuated to deliver these articles in side-by-side relationship to a releasing mechanism. Upon completion of the loading of the releasing mechanism, the same is actuated to deposit the accumulated group of articles onto a pallet carried by an automatic elevator mechanism. The elevator mechanism automatically lowers the pallet a predetermined distance after the articles are deposited thereon so that the releasing mechanism may be reloaded to deposit subsequent groups of articles onto the pallet in the elevator mechanism until the pallet is loaded. Upon being loaded, the pallet is automatically moved to the bottom of the machine by the elevator where it is discharged in its loaded condition therefrom and replaced with a second empty pallet which is carried to a position immediately below the releasing mechanism so that accumulated groups of articles may be deposited thereon. Thereafter, the cycle of the stacking machine is repeated. A mechanism for preselecting the number of stacks to be accumulated on the pallet before the elevator mechanism discharges the pallet therefrom and to determine the orientation of each article in the accumulated group is provided by our stacking machine.

Accordingly, it is the primary object of our invention to provide an inexpensive, durable and efficient stacking machine which is easily manufactured, operated and maintained.

Another object of our invention is to provide a stacking machine which is well adapted to handle articles such as crates or cartons and stack these articles on a pallet.

Another object of our invention is to provide a stacking machine in which the number of stacks received by each pallet may be easily pre-selected as desired.

Another object of our invention is to provide a stacking machine having relatively few moving parts to wear out or become out of adjustment.

Another object of our invention is to provide a stacking machine which is well adapted to be operated in conjunction with one or a plurality of assembly lines to receive articles discharged therefrom at a substantially constant rate and automatically load these articles onto pallets in an automatic sequence.

Another object of our invention is to provide a stacking machine which will operate substantially automatically and will require little attention from an operator during this operation.

Another object of our invention is to provide an automatic stacking machine which will properly orient each article as it is received in the machine so that any of a plurality of stacked patterns may be achieved.

Another object of our invention is to provide an automatic stacking machine which will utilize conventional power sources such as compressed air and electricity which are found in most processing platnts.

Another object of our invention is to provide an automatic stacking machine which will occupy little floor space and which may be installed in processing plants without major alteration of the plant.

Other and further objects and advantages of our invention will become more apparent from the following description when taken in conjunction with the accompanying drawings wherein like characters of reference designate corresponding parts throughout and in which:

FIG. 3 is a partial cross sectional view taken along the line 3—3 in FIG. 1 showing the cross feed roll section, the turning section and the rake mechanism of the stacking machine;

FIG. 4 is a partial cross sectional view taken along the line 4—4 in FIG. 3 showing the skate-wheel assembly of the turning section;

FIG. 7 is a partial cross-sectional view of the stacking machine shown in FIG. 1 showing the apron of the releasing mechanism;

FIG. 8 is a partial cross-sectional view of one end of the apron taken along line 8—8 in FIG. 7;

FIG. 9 is a cross-sectional view of one of the rolls of the apron taken along the line 9—9 in FIG. 8 and showing the construction of the clutch mechanism of the roll;

FIG. 10 is a partial cross-sectional view taken along line 10—10 in FIG. 1 and showing the compression section of the releasing mechanism in cross-section;

FIG. 17 is a schematic representation of the infeed roll section, turning section and cross feed roll section of the invention showing an article not being turned in the turning section;

FIG. 18 is a schematic representation of the invention as shown in FIG. 16 showing an article as being turned in the turning section;

FIG. 19 is a schematic representation of the invention as shown in FIG. 16 showing a layer of articles on the cross feed section;

FIG. 20 is a schematic representation of the invention as shown in FIG. 16 showing a layer of articles on the cross-feed section when case stops are used;

FIG. 21 is a schematic representation of one pattern stacked by the invention;

FIG. 22 is a schematic representation of another pattern stacked by the invention; and FIG. 23 is a partial enlarged elevational view of the numerical control tape used for the pattern of FIG. 21.

These figures and the following detailed description show specific embodiments of the invention, however, the inventive concept is not limited thereto since it may be embodied in other equivalent forms.

Figure 1:
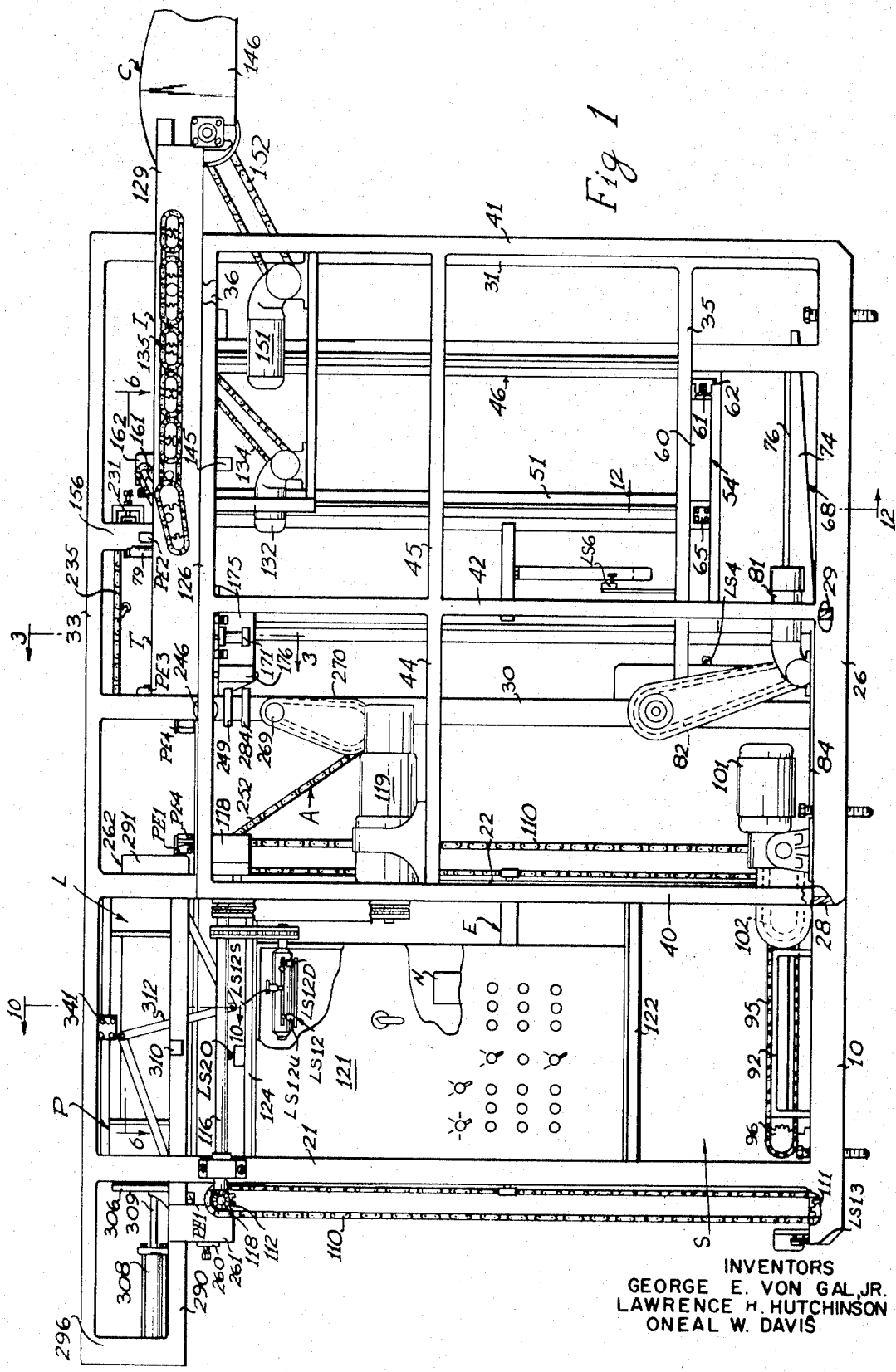
FIG. 1 is a side elevational view of a stacking machine constructed in accordance with our invention.
Figure 2:
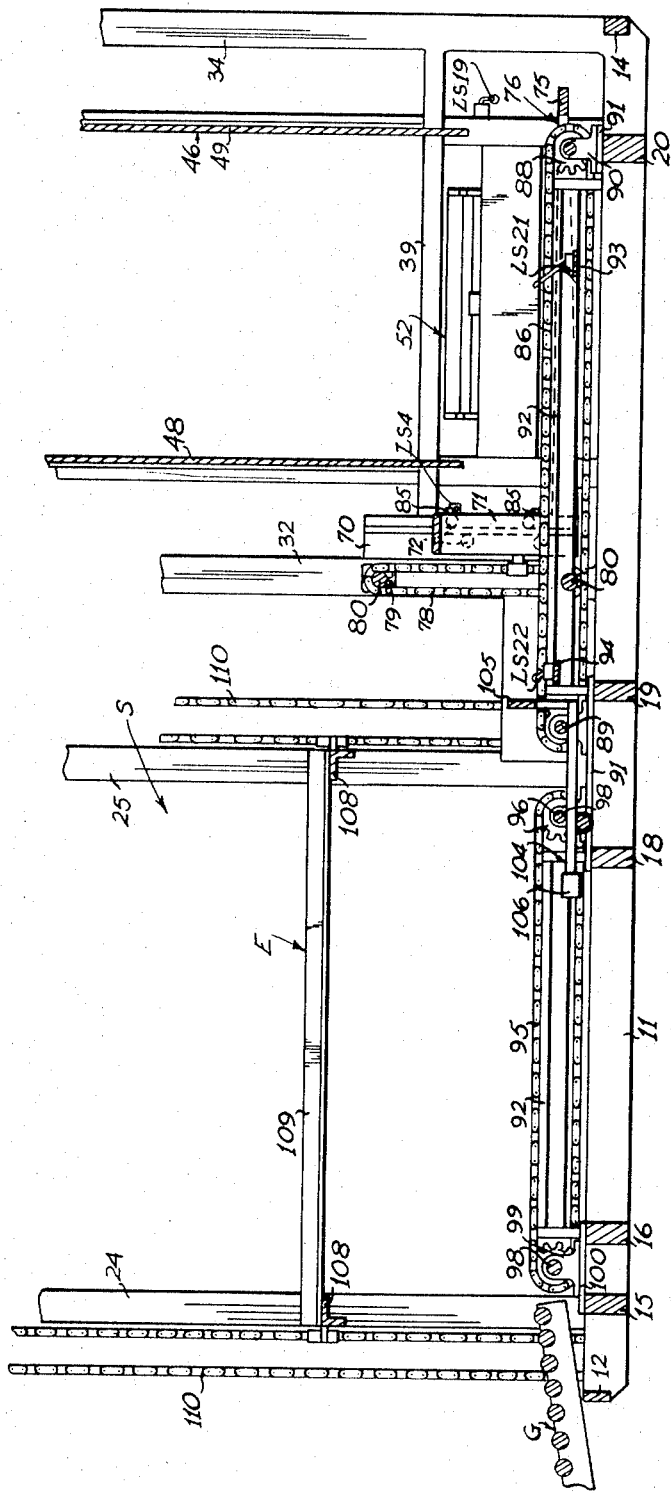
FIG. 2 is a partial cross sectional view of the stacking machine shown in FIG. 1 illustrating the pallet loading and discharge mechanism.

Referring now in detail to the embodiments herein chosen for the purpose of illustrating the invention, it will be seen that the frame structure of our stacking machine is made up of a plurality of beams which are welded or otherwise secured together. This frame comprises a pair of spaced longitudinal base members 10 and 11 connected at their ends by a front transverse base member 12 and a rear transverse base member 14 to provide a rectangular base B which supports the principal part of the remaining structure. This structure is shown in FIGS. 1 and 2. Within this base and running transversely thereof are a plurality of spaced reinforcing ribs 15, 16, 18, 19 and 20 which provide support for the pallet transfer mechanism hereinafter to be described.

On the front portion of the base B, and extending upwardly from the longitudinal base members 10 and 11 are four spaced elevator upright standards 21, 22, 24 and 25 which define an elevator shaft S, their upper portions of which are adapted to receive the releasing mechanism for dropping the articles onto the elevator. This structure is also shown in FIGS. 1 and 2.

On the rear portion of the base B as shown in FIGS. 1 and 2 are four spaced magazine upright standards 30, 31, 32 and 34, the lower and central portions of which are adapted to receive the pallet magazine of the pallet transfer mechanism and the upper portions of which are adapted to receive the feed mechanism and the rake or ram mechanism for loading the releasing mechanism. For reinforcement, lower and upper spaced longitudinal struts 35 and 36 extend between the upright standards 30 and 31 and upper and lower spaced longitudinal struts 38 and 39 extend between the upright standards 32 and 34 as shown in FIGS. 2 and 3.

A longitudinal connecting member 33 joins the top of upright standards 21, 22, 30 and 31 and a parallel longitudinal connecting member 37 joins the top of upright standard 24, 25, 32, and 34 as shown in FIGS. 2 and 3. Transverse connecting members 43 connect the tops of upright standards 21 and 24, 22 and 25, 30 and 32, and 31 and 34 respectively.

The transverse base member 14 extends outwardly past the end of the longitudinal base member 10 and connects with a secondary longitudinal base member 26 which extends parallel to the base member 10 and is spaced therefrom by the member 14 and a pair of secondary transverse base members 28 and 29 as seen in FIG. 1. The secondary base member 26 extends along parallel to the longitudinal base member 10 and terminates substantially in the area the upright standard 22.

On each end of the secondary base member 26 and extending upwardly therefrom is a secondary upright standard 40 and 41 which, in conjunction with an intermediate upright standard 42, extending upwardly from approximately the mid point of the secondary longitudinal base member 26, and the upper portions of the upright standards 30 and 31 support a portion of the feed mechanism. A pair of reinforcing struts 44 and 45 extend between the secondary upright standard 40 and the intermediate upright standard 42 and the intermediate upright standard and the secondary upright standard 41 respectively as seen FIG. 1.

PALLET TRANSFER MECHANISM

As is seen best in FIGS. 1, 2 and 3, a reinforced pallet magazine 46 is carried by the longitudinally extending struts 35, 36, 38 and 39. The pallet magazine 46 is open on the far side as seen in FIG. 1 to allow easy access for placing the pallets (not shown) therein and is open at the bottom thereof for the discharge of pallets (not shown) therefrom. Plates 48, 49 and 50 close the front, back and top of the pallet magazine respectively. A reinforced stop member 51 extending between the longitudinal struts 35 and 36 prevent the pallets from being inadvertently pushed through the near side of the pallet magazine 46 as seen in FIG. 1.

Figure 12:
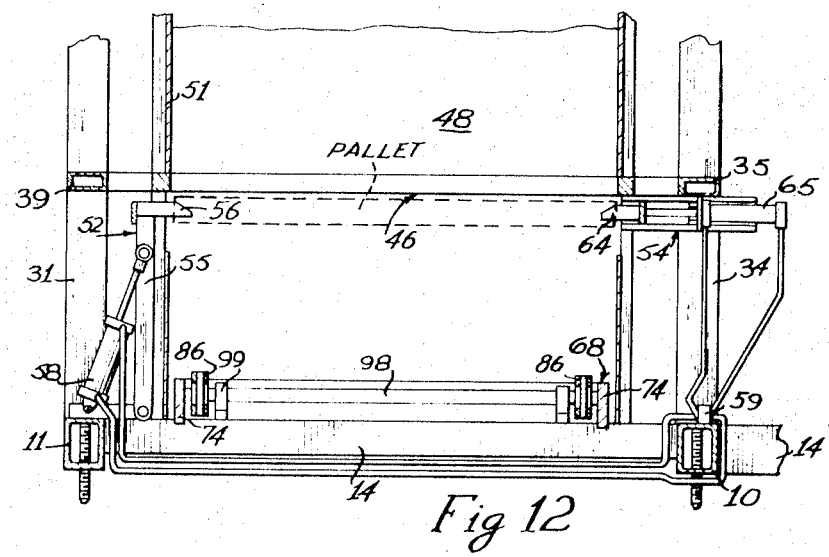
FIG. 12 is a partial cross-sectional view taken along line 12—12 in FIG. 1.

The pallets are held within the pallet magazine 46 by front and rear pallet retainers 52 and 54 respectively which are carried by longitudinal base member 11 and longitudinal strut 35 respectively as best seen in FIG. 12. The front pallet retainer 52 comprises an upright frame 55 pivotally carried by the upper extending edge of the longitudinal base member 11 and a pair of inwardly extending retainer plates 56 mounted on frame 55 which extends into the pallet magazine to selectively support pallets therein. The frame 55 positions the retainer plates 56 at each end thereof just below the longitudinally extending strut 39 and, when the upright frame 55 is in a vertical position, the retainer plate 56 extends out into the magazine 46 so as to engage the lower most pallet in the magazine 46. An air cylinder 58 is pivotally connected to the upright frame 55 and to the longitudinal base member 11 so as to selectively extend into and retract from the pallet magazine 46 the retainer plates 56. An electrically operated solenoid air valve 59 selectively supplies air to cylinder 58 so as to retract or extend the retainer plates 56 into the pallet magazine 46.

The rear pallet retainer 54 includes a frame 60 having rollers 61 as seen in FIG. 1 on each end thereof which engage a track 62 attached to the underside of the longitudinal strut 35 so that the frame 60 may be easily moved along the track 62. Extending forwardly from each end of the frame 60 is a retainer plate 64 in a manner similar to that in which the retainer plates 56 extend from the frame 55 as best seen in FIG. 12. When the frame 60 is in its forwardmost position, the retainer plates 64 extend into the pallet magazine 46 just below the longitudinal strut 35 so as to engage the lowermost pallet in the pallet magazine 46 and, in conjunction with the retainer plates 56 of the front pallet retainer 52, serve to retain the pallets in the pallet magazine 46. An air cylinder 65 similar to the cylinder 58 is attached to the underside of the longitudinal strut 35 and is connected with the frame 60 so as to selectively retract and extend the retainer plates 64 in the magazine 46. The electrically operated solenoid air valve 59 selectively supplies air to the cylinder 65 so as to extend and retract the retainer plates 64 in the magazine 46.

A pallet elevator 68 is carried on tracks 69 and 70 attached to the upright standards 30 and 32 respectively as seen in FIGS. 1, 2 and 12. The pallet elevator 68 comprises a frame 71 having rollers 72 thereon which engage the tracks 69 and 70 respectively so that the frame 71 is freely movable vertically. Attached to and extending rearwardly along the base B from the frame 71 is a pair of side members 74 which extend under the pallet magazine 46 and are connected at their extending ends by a cross member 75 which, together with the side members 74, define a pallet elevator platform 76. The side members 74 are positioned so that one side member 74 is just inwardly of the uprights 30 and 31 and the other side member 74 is just inwardly of the uprights 32 and 34.

For raising and lowering the pallet elevator 68, there is provided a pair of pallet elevator chains 78 carried by sprockets 79 mounted on cross shafts 80 rotatably carried by the uprights 30 and 32. The pallet elevator chains 78 are connected to the frame 71 at each side thereof so that movement of the pallet elevator chains 78 results in vertical movement of the frame 71 and pallet elevator platform 76. The top cross shaft 80 is rotatably driven by a reversible motor drive unit 81 through a chain and sprocket arrangement 82 connecting the motor drive unit 81 to the upper cross shaft 80. The motor drive unit 81 is fixedly mounted on a support plate 84 mounted on the secondary transverse base members 28 and 29. An electrical switch LS4 is mounted on the upright track 70 and, in connection with a pair of lugs 85, serve to limit the up and down movement of the frame 71 and platform 76. When the platform 76 is raised by the pallet elevator chains 78 to a position just below the retainer plates 56 and 64, the outer end of the platform 76 contacts a switch LS19 which serves to retract the retainer plates 56 and 64 to release the pallets contained in the pallet magazine 46 onto the elevator platform 76. The switch LS4 serves to stop the upward movement of the elevator platform 76 after the pallet retainers 56 and 64 are retracted. As the pallet elevator chains 78 move the pallet elevator platform 76 downwardly again, the switch LS-19 is deactivated so that the pallet retainers 56 and 64 are again extended by the air cylinders 58 and 65 respectively so that the second lowermost pallet in the pallet magazine 46 is engaged and retained within the pallet magazine 46 by the retainer plates 56 and 64 so that only one pallet remains on the pallet elevator platform 76 as it moves downwardly. The switch LS4 serves to stop the downward movement of the elevator platform 76 when it is contacted by the appropriate lug 85.

Positioned between the side members 74 of the pallet elevator platform 76 is a pair of pallet magazine feed chains 86 as seen in FIGS. 2 and 12 onto which the pallet contained on the pallet elevator platform 76 is deposited when the pallet elevator platform 76 reaches its lowermost limit. The feed chains 86 are carried by sprockets 88 mounted on cross shafts 89 rotatably journaled in bearings 90. The bearings 90 are fixedly supported on support plates 91 carried by the reinforcing ribs 19 and 20. Each of the feed chains 86 are supported on runners 92 between the sprockets 88 to prevent the feed chains 86 from sagging under the weight of the pallet deposited thereon by the elevator platform 76.

Positioned within the elevator shaft S defined by the upright standards 21, 22, 24 and 25 is a pair of loading and unloading feed chains 95 aligned with the pallet magazine feed chains 86 as best seen in FIGS. 1 and 2. The loading and unloading feed chains 95 are carried by sprockets 96 mounted on rotatable shafts 98 journaled in bearings 99, one pair of which is mounted on support plate 91 and one pair of which is mounted on a support plate 100. A second pair of runners 92 carry the upper flight of the feed chains 95 to prevent sagging of the feed chains 95 when a pallet is resting thereon.

The feed chains 86 and 95 are driven by a common motor drive unit 101 through a chain and sprocket arrangement 102, the motor drive unit 101 being supported on support plate 84. A counter balanced pallet stop 104 as seen in FIG. 2 is pivotably carried intermediate its ends between base members 10 and 11 by a shaft 13 and positioned so that a stop plate 105 attached thereto extends upwardly from between the pallet magazine feed chains 86 just rearwardly of the forward drive sprockets 88 so as to engage pallets being advanced by the feed chains 86 to prevent the discharge therefrom onto the feed chains 95. A weight 106 carried at the forward end of the pallet stop 104 serves to urge the pallet stop 104 counter clockwise as seen in FIG. 2 so that the stop plate 105 is urged upwardly toward its extended position. The pallet stop 104 is retracted through clockwise rotation by the main elevator of the stacking machine as will be explained hereinafter.

An electrical switch LS21 is mounted on a cross member 93 extending between the runners 92 under the pallet magazine 46 and is activated when a pallet is deposited on the feed chains 86 as seen in FIG. 2. Activation of LS21 will start the motor drive unit 101 and propel the pallet resting on the upper flight of the feed chains 86 forward toward the elevator shaft S and onto the chains 95. Just rearwardly of the forward drive sprockets 88 is provided an electrical switch LS22 carried by a cross member 94 extending between the runners 92 and is activated when the pallet on the feed chains 86 is over the switch LS22. This serves to stop the motor drive unit 81 when the pallet is in proper position on the feed chains 95 in the elevator shaft S.

ELEVATOR MECHANISM

An elevator E as seen in FIGS. 1 and 2 is carried within the elevator shaft S and comprises a pair of transverse horizontally extending L beams 108. Longitudinally extending pallet retaining channels 109 extend between and are attached to the L beams 108 and are spaced apart a sufficient amount to receive a pallet thereon transferred by the loading and unloading feed chains 95. The L beams 108 are spaced apart so as to just fit over each end of the loading and unloading feed chains 95 in order that the elevator E will descend below the level of the upper flight of the loading and unloading feed chains 95. When the elevator E is in its lowermost position, the rear L beam 108 engages and depresses the pallet stop 104 so as to retract the stop plate 105 downwardly and allow a pallet on the feed chains 86 to be discharged onto the chains 95.

The elevator E is carried by four elevator chains 110, one elevator chain 110 being mounted adjacent each upright standard 21, 22, 24 and 25 which define the elevator shaft S. The chains 110 are carried at their lower end by sprockets 111 rotatably mounted within the longitudinal base members 10 and 11 just forwardly of the upright standards 21 and 22 and just rearwardly of the upright standards 24 and 25. The upper ends of the elevator chains 110 are carried by sprockets 112 mounted on rotatable shafts 114 journaled in bearings 115 mounted on the front of upright standards 21 and 24 and the rear of upright standards 22 and 25 just below the releasing mechanism.

The elevator E is attached to the rear flight of the feed chains 110 just forward of the uprights 21 and 22 and to the forward flight of the feed chains 110 just rearwardly of the upright 24 and 25. Therefore, it can be seen that rotation of the shafts 114 imparts an upward or downward vertical movement to the elevator E. A drive shaft 116 rotatably journaled on the upright standards 21 and 22 simultaneously drives both shafts 114 through angle drive gear arrangements 118. The drive shaft 116 is driven by the main drive motor unit 119 through a chain and sprocket arrangement 120.

A control panel 121 is mounted between the upright standards 21 and 22 on a lower cross member 122 and an upper cross member 124 extending between the upright standards 21 and 22 and carries therein a cam operated control switch LS12 connected to the drive shaft 116 through a chain and sprocket arrangement 125. This is shown in FIG. 1 The switch LS12 serves to control both the upper and lower limits of movement of the elevator E.

An overload safety switch LS20 is mounted on the upper cross member 124 under the drive shaft 116 and is activated by the drive shaft 116 upon deflection of the drive shaft 116 if it is overloaded. The safety switch LS20 serves to stop the automatic operation of the machine if such an overload is detected on the elevator E.

FEED MECHANISM

The feed mechanism of the stacking machine comprises an infeed belt conveyor C, an infeed roll section I, a turning section T, and a cross feed roll section R.

Infeed Roll Section

Figure 5:
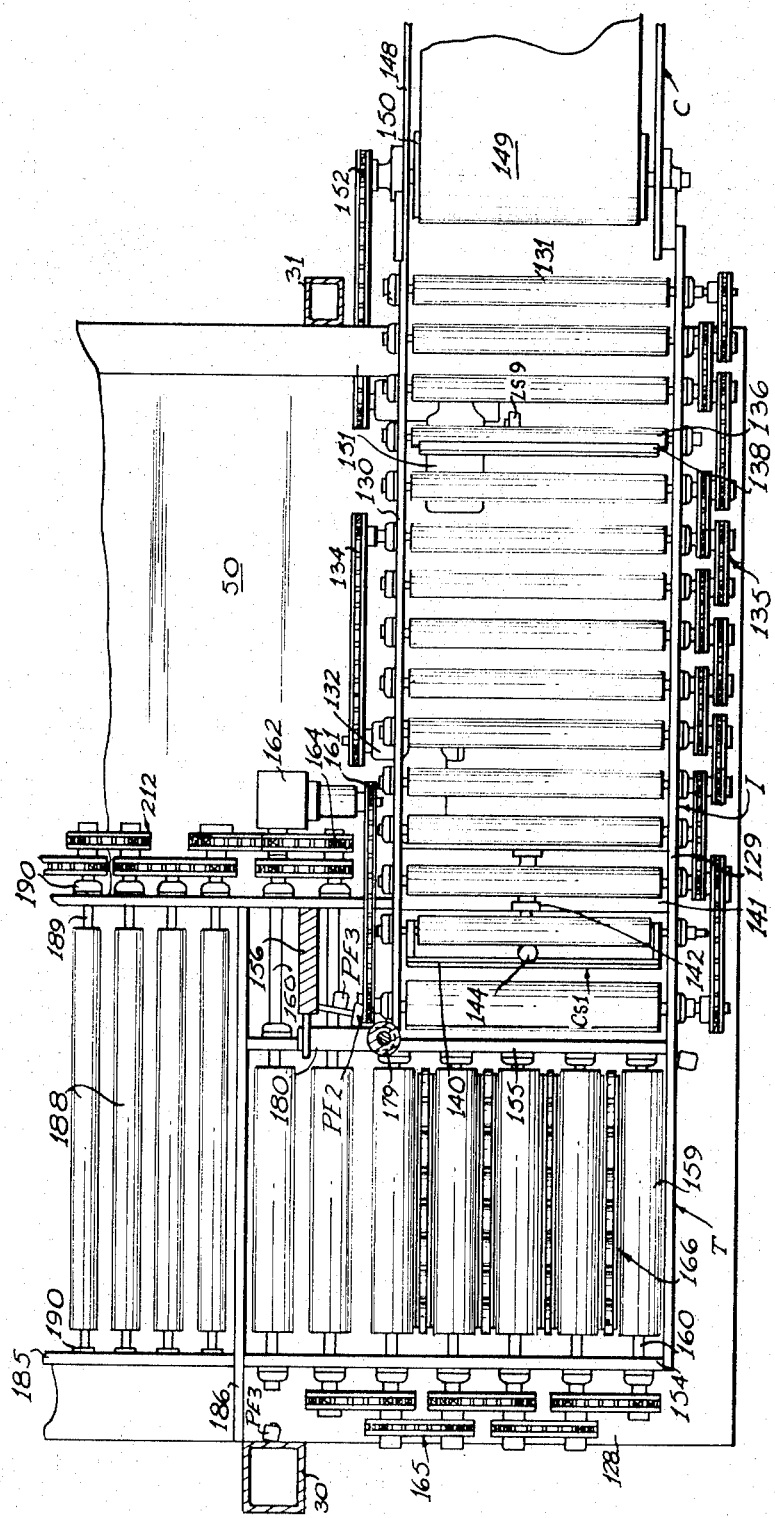
FIG. 5 is a partial top plan view of the stacking machine shown in FIG. 1 showing the infeed roll section and the turning section of the stacking machine.

The upper extending ends of the secondary uprights upright standards 40 and 41 and the intermediate upright standard 42 are joined by an upper connecting member 126 which is joined to the uprights 22 and 31 by cross braces 128 as best seen in FIGS. 1, 3 and 5. Mounted on top of the connecting member 126 is a longitudinally extending roller support beam 129 and mounted on top of the longitudinal strut 36 is a complimentary roller support beam 130. The support beams 129 and 130 rotatably carry therebetween a plurality of driven feed rolls 131 over which the articles to be stacked are fed to the machine.

The feed rolls 131 are driven by a motor drive unit 132 through a drive chain 134 connected to one of the rolls 131, the roll 131 being drivably connected to the other rolls 131 through a transfer chain drive section 135. Positioned between the third and fourth feed rolls 131 from the right as seen in FIG. 5 is a switch activator roll 136 having an upwardly extending projection 138 which engages the articles as they pass along the feed rolls 131 from the right to the left as seen in FIG. 5 and serves to activate a switch LS9, the function of which is to stop the feed mechanism when a predetermined number of articles are stopped on the rolls 131.

The second feed roll 131 from the left end of the infeed roll section I is slightly shorter than the other feed rolls 131 so as to pivotably mount a case stop CS-1 on the shaft 133 of the feed roll 131 so that it is independently rotatable with respect to the shaft 133. Case stop CS-1 comprises a pair of end plates 139 carried by the feed roll shaft 133 at each end of the feed roll 131. A stop plate 140 joins the extending ends of the plates 139 and is effective to contact and stop articles on the infeed roll section I when extended but not contact such articles when retracted. A self retracting air cylinder 142 is carried under the rolls 131 by a cross plate 141 and is effective to extend case stop CS-1 through its bumper 144. An electrically operated solenoid air valve 145 selectively supplies air to the air cylinder 142 to selectively extend the bumper 144 and extend case stop CS-1.

Infeed Belt Conveyer

The infeed belt conveyer C is attached to the right end of the infeed roll conveyer I as seen in FIG. 5 through its spaced side plates 146 and 148 extending to the plant floor level. A conveyer belt 149 is mounted on support pulleys 150 rotatably mounted between the upper ends thereof and the lower ends (not shown) thereof. The belt 149 is driven by the motor drive unit 151 through an appropriate chain and sprocket arrangement 152 connected to the upper support pulley 150. The belt 149 is moved so that articles placed thereon at floor level are carried upwardly and deposited on the infeed roll conveyer I.

Turning Section

The roll support beam 129 extends forwardly past the end of the feed rolls 131 to form the end support plate of the turning section T as seen in FIGS. 3 and 5. Extending transversely of the machine and perpendicular to the forward end of roll support beam 129 is a transverse turning roll support beam 154 and spaced rearwardly of the support beam 154 and parallel thereto is a complimentary transverse roll support beam 155 attached to a support beam 129 at one end thereof and to an intermediate upright standard 156 positioned between longitudinal strut 36 and the upper longitudinally extending connecting member 33 connecting the upper extending ends of the upright standards 21, 22, 30 and 31 as seen FIG. 1.

Rotatably mounted between the support beams 154 and 155 are a plurality of longitudinally extending turning rolls 159 fixedly mounted on shafts 160 appropriately journaled in the support beams 154 and 155. The turning rolls 159 are of a slightly larger diameter than the feed rolls 131 and are positioned by the support beams 154 and 155 so that their upper most surface is in the same horizontal plane of the upper surface of the feed rolls 131.

The turning rolls 159 are rotatably driven by a chain and sprocket arrangement 161 connected to the forwardmost feed roll 131 and to a right angle drive transmission 162. The right angle drive transmission 162 is in turn connected to the rearmost extending end of one of the shafts 160 through an appropriate chain and sprocket arrangement 164 so that as the motor drive unit 132 drives the feed rolls 131, the turning rolls 159, to which the chain and sprocket arrangement 164 is connected, are driven. The forwardly extending end of the shaft 160 through which the chain and sprocket arrangement 164 is attached is drivingly connected to the other shafts 160 of the turning rolls 159 by a transfer chain arrangement 165 so that, as the turning roll 159 to which the chain and sprocket arrangement 164 is attached is rotated, all of the turning rolls 159 are rotated simultaneously in the same rotational direction. The turning rolls 159 are rotated, as seen in FIG. 3, in a clockwise direction so that the articles discharged onto the turning rolls 159 from the feed rolls 131 are propelled from the left to the right as seen in FIG. 3.

Positioned just below the turning rolls 159 is a skate-wheel assembly 166 as seen in FIGS. 3, 4 and 5. The skate-wheel assembly 166 comprises a rectangular base support plate 168 carrying thereon four rows of skate wheels 169 through upstanding skate wheel supports 170. The skate wheel supports 170 position the skate wheels 169 so that one row of skate wheels 169 extends between the outermost turning roll 159 and the adjacent roll 159, one row of skate wheels 169 extends between the next adjacent pair of turning rolls 159 and so on for the four rows of skate wheels 169.

The skate wheel supports 170 position the skate wheels 169 so that, when the base support plate 168 is in its extended position, the upper surface of the skate wheels 169 extend just above the upper surface of the turning rolls 159. Therefore, when articles are discharged from the forwardmost end of the infeed roll conveyor I, the article is supported by the skate wheels 169 rather than the turning rolls 159. However, when the base support plate 168 is retracted, the skate wheels 169 do not extend above the turning rolls 159 thereby allowing articles discharged from the feed rolls 131 to rest on the turning rolls 159 and be propelled from the left to the right as seen in FIG. 3.

The base support plate 168 is carried by a vertically disposed self-retracting air cylinder 171 effective to selectively extend and retract the base support plate 168 so as to alternately position the skate wheels 169 above the upper surface of the turning rolls 159 and below the upper surface of the turning rolls 159. The downward movement of the base support plate 168 is checked by a pair of bumpers 172, and a pair of guide rods 170 are attached to the base support plate 168 and extend downwardly therefrom to insure proper orientation of the base plate 168 as it moves vertically. The air cylinder 171 is mounted on a longitudinally extending mounting bracket 175 attached to the beams 154 and 155. The bracket 175 also mounts a pair of guides 176, one of either side of the air cylinder 171, so that the guide rods 174 may be moved vertically.

An electrically operated solenoid air valve 178 is effective to selectively supply air to the air cylinder 171 so as to extend the base support plate 168 and skate wheels 169. It will also be noted that the skate wheels 169 are freely rotatable within the skate wheel supports 170 so that an article that is discharged thereon from the feed rolls 131 will continue to roll forwardly under its own momentum until its forward movement is checked by the upstanding edge of the turn roll support beam 154 extending above the upper surface of the turning rolls 159.

A vertically disposed rotatable pivoting roll 179 is fixedly mounted on the intermediate upright standard 156 by mounting brackets 180 which are effective to position the vertical pivoting roll 179 at the juncture of the complementary roll support beam 155 and the complementary roll support beam 130. Therefore, it will be seen that an article being propelled from the right to the left as seen in FIG. 5 will be pivoted around the vertical pivoting roll 179 when the front portion of the article is contacted by the upper surface of the turning rolls 159 so that the article is rotated 9° as it is transferred from the feed rolls 131 to the turning rolls 159. It will also be noted, however, that if the skate wheels 169 are in their extended position, the article traveling along the feed rolls 131 will not be turned around the vertical pivoting roll 179 but will proceed straight forward until checked by the turn roll support beam 154 in the above mentioned manner. When the skate wheels 169 are lowered by the air cylinder 171, the article will be propelled from the left to the right as seen in FIG. 3 without being turned 90 degrees so that articles may be selectively turned 90° or left straight by the turning section T.

The Cross Feed Roll Section

Figure 6:
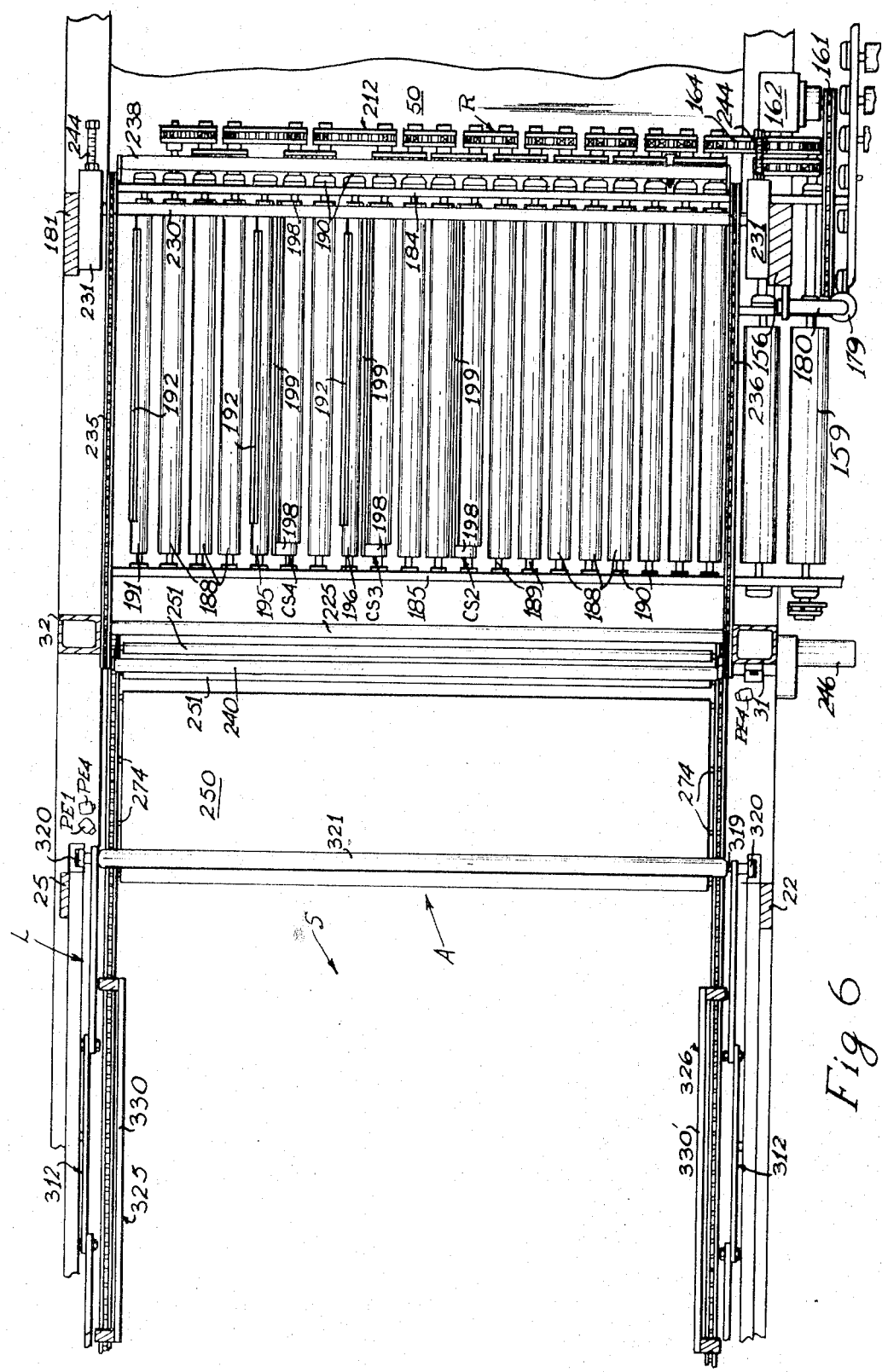
FIG. 6 is a partial cross sectional view of the stacking machine of FIG. 1 taken along line 6—6 and showing the cross feed roll section rake mechanism and releasing mechanism.

Extending transversely between the intermediate upright standard 156 and a complementary upright standard 181 which extends between the longitudinal strut 38 and the upper longitudinally extending connecting member 37 is a cross feed roll support beam 184 as best seen in FIGS. 3 and 6. Spaced forwardly of and parallel to the beam 184 as well as being aligned with the turn roll support beam 154 is a complementary cross feed roll support beam 185. End plates 186 connect opposite ends of the cross feed roll support beams 184 and 185 to reinforce these beams.

A plurality of cross feed rolls 188 are positioned between the support beams 184 and 185 and have their shafts 189 rotatably journaled in bearings 190 attached to the support beams 184 and 185. Positioned outwardly of the outermost roll 188 is a switch activator roll 191. This roll is shown on the right in FIG. 3 and has an upwardly extending projection 192 which extends into the path of an article moving from the left to the right as seen in FIG. 3 so that when such an article is so moving, the front edge thereof will contact the upwardly extending projection 192 and rotate the activator roll 191 which in turn causes a mechanically activated switch LS1 to be activated through the switching projection 194.

Counting from the right to the left in FIG. 3, it will be seen that a second switch activator roll 195 is mounted between the third and fourth cross feed roll 188 and rotatably carried by the support beams 184 and 185. The mechanically activated switch LS7 is activated when an article travelling from the left to the right across the cross feed rolls 188 strike the upwardly extending projection 192 of the activator roll 195 and cause the switching projection 194 thereon to activate the switch LS7.

Again, counting from the right to the left in FIG. 3, it will be seen that a third switch activator roll 196 is positioned between the fifth and sixth cross feed roll 188 and rotatably carried between the support beams 184 and 185. When an article travelling from left to right across the cross feed rolls 188 strikes the upwardly extending projection 192 of the third activator roll 196, it will be seen that it appropriately pivots the roll 196 and causes the switching projection 194 thereon to activate the switch LS2.

The shaft 160 of the innermost turning roll 159 drives each of the cross feed rolls 188 through the appropriate transfer chain and sprocket arrangement 212. The cross feed rolls 188 are driven in a clockwise direction as seen in FIG. 3 so that articles discharged thereon from the turning section T are moved from the left to the right as indicated by the arrow 213 in FIG. 3.

Rotatably mounted on the shaft 189 of the fourth cross feed roll 188 counting from the right to the left in FIG. 3 is a case stop CS-4. The case stop CS-4 is similar to the case stop CS-1 described hereinbefore and includes a pair of end plates 198 rotatably mounted on the shaft 189 at each end of the cross feed roll 188 with the outer extending ends thereof joined by a stop plate 199. A self-retracting cylinder 200 mounted on plate 201 under the cross feed rolls 188 extends and retracts the case stop CS-4 through a bumper 202 mounted on the extending end of the piston rod 204. An electrically operated solenoid air valve 205 is mounted on a support plate 206 adjacent the air cylinder 200 and is effective to selectively supply air to the cylinder 200 from air line 207 to selectively extend and retract the piston rod 204.

A case stop CS-3 is rotatably mounted on the shaft 189 of the sixth cross feed roll 188 and is similar to the case stop CS-4 mounted on the fourth cross feed roll shaft 189. The case stop CS-3 has end plates 198 joined by stop plate 199. An air cylinder 208 selectively extends and retracts the case stop CS-3 through its bumper 202 mounted on its piston rod 204. An electrically operated solenoid air valve 209 is carried by the support plate 206 adjacent the air cylinder 208 and is effective to supply air from air line 207 to the cylinder 208 to selectively extend and retract the piston rod 204 so as to extend and retract the case stop CS-3.

Rotatably mounted on the shaft 189 of the ninth cross feed roll 188 is a case stop CS-2 similar to the case stops CS-3 and CS-4. The case stop CS-2 has end plates 198 with their extending ends joined by stop plate 199. An air cylinder 210 mounted on the plate 201 below the cross feed rolls 188 is effective to extend and retract the case stop CS-2 through its bumper 202 and piston rod 204. An electrically operated solenoid air valve 211 is mounted on the support plate 206 adjacent the air cylinder 210 and is effective to supply air to the cylinder 210 from line 207 to selectively extend and retract the piston rod 204 so as to extend and retract the case stop CS-2.

Positioned above the right end plate 186 as seen in FIG. 3 is a case stop CS-5. This case stop is effective to stop the motion of the articles on the cross feed rolls 188 as seen in FIG. 3 and comprises a stop plate 214 mounted on a pair of spaced rod guides 215 slidably received in block guides 216 fixedly mounted on a support plate 218 fixedly mounted to the underside of a longitudinally extending box member 219 extending between the upright standards 32 and 37.

Positioned between the block guides 216 on the support plate 218 is an air cylinder 220 having its piston rod 221 attached to the stop plate 214 to selectively extend and retract the stop plate 214. An electrically operated solenoid air valve 222 mounted on the support plate 206 selectively supplies air from line 207 to the air cylinder 220 to selectively extend and retract the stop plate 214. When the stop plate 214 is extended, it is effective to move articles on the cross feed rolls 188 2 inches to the left from that at which it positions the articles on the cross feed rolls 188 when the stop plate 214 is at its retracted position as seen in FIG. 3.

RAKE MECHANISM

Figure 11:
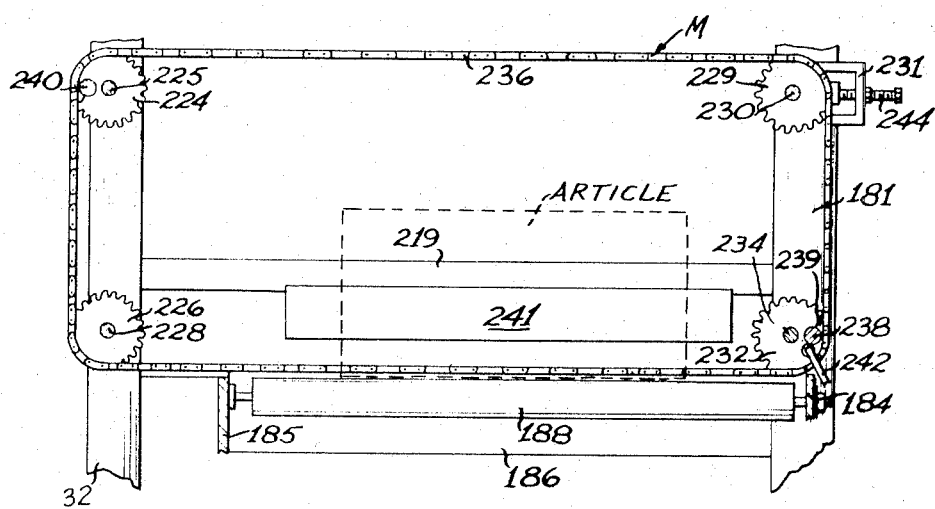
FIG. 11 is a partial cross-sectional view of the stacking machine of FIG. 1 showing the rake mechanism.

Referring to FIGS. 3, 6, and 11, it will be seen that the rake mechanism M comprises a first pair of laterally spaced sprockets 224 mounted on a shaft 225 rotatably carried in the upright standards 30 and 32 just below the upper ends thereof, a second pair of sprockets 226 rotatably mounted on individual shafts 228 rotatably journaled in the upright standards 30 and 32 below the sprockets 225 and above the end plates 186, a third pair of sprockets 229 mounted on a shaft 230 rotatably journaled in a pair of adjustable bearings mountings 231 just below the upper ends of the upright standards 156 and 181, and a fourth pair of sprockets 232 mounted on a shaft 234 rotatably journaled in the upright standards 156 and 181 below the sprockets 229 and above the end plates 186. The sprockets 224 and 226 are in the same vertical plane and the sprockets 229 and 232 are in the same vertical plane. Also, the sprockets 224 and 229 are in the same horizontal plane and the sprockets 226 and 232 are in the same horizontal plane. One of each pair of sprockets 224 and 226, and 229 and 232 is positioned adjacent the upright standard 30 and the upright standard 156 respectively, and one of each pair of sprockets 224 and 226 and 229 and 232 is positioned adjacent the upright standard 32 and the upright standard 181. Extending around the sprockets 224, 226, 229 and 232 adjacent the upright standards 30 and and 156 is a first rake chain 235 and extending around the sprockets 224, 226, 229 and 232 adjacent the upright standards 32 and 181 is a second rake chain 236. Rotatably carried between the rake chains 235 and 236 is a first rake 238 rotatably journaled in mounting plates 239 attached to the rake chains 235 and 236, respectively. A second rake 240 is rotatably mounted between the rake chains 235 and 236 by mounting plates 241 attached to the rake chains 235 and 236. The second rake 240 is positioned one-half the distance around the rake chains 235 and 236 from the first rake 238. When the rakes 238 and 240 move into their low most positions, they pass just above rolls 188 as seen in FIGS. 3 and 11.

The lower flights of the rake chains 235 and 236 ride on top of the end plates 186, as seen in FIGS. 3 and 11 for support thereof and the adjustable bearings mountings 231 are effective to selectively tighten the rake chains 235 and 236 when the set screws 244 thereof are manipulated. When the rakes 238 or 240 are moved across the cross feed rolls 188, articles resting on the cross feed rolls 188 are removed therefrom toward the front of the stacking machine and onto the apron assembly A of the releasing mechanism L.

An air motor 246 carried by the upright standard 30 is drivingly connected to the shaft 225 through a chain and sprocket arrangement 248. Therefore, when the motor 246 is operating the rake chains 235 and 236 are rotated clockwise as seen in FIG. 11. An electrically operated solenoid air valve 249 selectively supplies air to the air motor 246 from line 207 to impart rotation thereto and is controlled by the switch LS 15.

The mechanically activated electrical switch LS15 is positioned so that the rakes 238 or 240 contact the activator 242 thereof just rearwardly of the cross feed roll support beam 184.

RELEASING MECHANISM

The releasing mechanism L comprises generally an apron assembly A and a compression and release assembly P as best seen in FIGS. 7 and 10. The apron assembly A serves to receive articles raked from the cross feed roll section R by the rake mechanism M and holds each layer of articles raked from the cross feed roll section R until a complete pallet layer has been made and then advances forwardly to the elevator shaft S taking with it the completed layer of articles raked from the cross feed roll section R. When the apron assembly A positions the completed layer in the elevator shaft S, the compression assembly P compresses the layer and holds it in position until the apron assembly A has retracted to deposit the completed layer onto a pallet resting within the main elevator E.

Apron Assembly

The apron assembly A comprises generally a skid plate 250 and a plurality of apron rolls 251 carried between a pair of apron chains 252, one chain being mounted in each side of the stacking machine. Each of the apron chains 252 has its upper flight thereof carried by an upper idler sprocket 254 mounted on a shaft 255 rotatably journaled in bearing blocks 256 mounted on the forward side of the upright standards 30 and 32 and idle sprockets 258 mounted on shaft 259 rotatably journaled in an adjustable bearing block 260 mounted forward of the upright standards 21 and 24 which form the front of the elevator shaft S. The adjustable bearing blocks 260 are mounted on support plates 261 carried by a longitudinally extending channel member 262 extending between the upright standards 21 and 22 and 24 and 25, respectively.

That portion of the lower flight of the apron chains 252 extending across the elevator shaft S is supported by support sprockets 264 rotatably mounted on the upper shafts 114 which carry the upper sprockets 112 supporting the elevator chains 110. The sprockets 264 are freely rotatable with respect to the shafts 114 so that the apron chains 252 may be freely moved independently of the particular rotation of the shafts 114. That portion of the lower flight of the apron chains 252 extending between the upright standards and the upright standards 30 and 32 angles downwardly and around a pair of drive sprockets 265 mounted on a drive shaft 266 rotatably journaled in bearing blocks 268 mounted on the forward side of the upright standards 30 and 32.

One end of the rotatable drive shaft 266 is driven by a reversible air motor 269 through a conventional chain and sprocket arrangement 270. The rear idler sprockets 254 and the drive sprockets 265 are vertically aligned so that a vertical flight of the apron chains 252 extends between the sprockets 254 and 265. This arrangment positions the rearmost edge of the apron chains just below and just rearwardly of the forwardmost flight of the rake chains 235 and 236. An upper horizontally extending chain support runner 271 extends under each of the upper flights of the apron chains 252 and is carried by the upright standards 21 and 22, and 24 and 25, respectively. That portion of the lower flight of the apron chains 252 extending across the elevator shaft S are supported by a lower support runner 272 also carried by the upright standards 21 and 22, and 24 and 25, respectively.

The skid plate 250 is mounted on the apron chains 252 through studs 274 extending from each end thereof. The skid plate 250 is approximately the width of one layer of articles to be discharged thereon from the cross feed roll section R by the rake mechanism M.

The apron rolls 251 are connected to the apron chains 252 through a uni-directional clutch assembly 275 which permits rotation of the rolls 251 in one direction only. The clutch assembly 275 comprises a web assembly 276 slidably received in a cylindrical recess 278 in each end of each apron roll 251 and a plurality of clutch rollers 279 positioned between the web assembly 276 and the wall of the cylindrical recess 278.

The web assembly 276 comprises a web portion 280 fixedly carried by a mounting pin 281 which is attached to and carried by the feed chains 252. The web portion 280 has appropriately formed recesses 282 which receive the clutch rollers 279 therein and permit free rotation of the clutch rollers 279 in the recesses 282 upon movement of the roller 251 in one direction but serve to force the rollers 279 outwardly along one side of the recesses 282 to provide a locking action when the apron roll 251 is urged in the other rotational direction.

Referring to FIG. 9, it will be seen that the direction of free rotation provided by the clutch assembly 275 is counter-clockwise while clockwise rotation is precluded. Referring to FIG. 7, it will be seen that each of the rolls 251 will be fully rotatable in a counter-clockwise direction while clockwise rotation is precluded so that articles discharged on that portion of the apron assembly A will continue to move forwardly under their own momentum until they rest on the skid plate 250 or contact other articles held by the skid plate 250. This serves to more closely position the articles on the apron assembly A so that a tight pattern is achieved on the apron assembly A to be deposited on a pallet contained in the main elevator E.

The movement of the apron chains 252 is controlled through a reversible, electrically operated, normally closed, solenoid air valve 284 so as to selectively reverse the air motor 269 to extend or retract the apron assembly A. Fixedly carried on a longitudinal extending support 285 between the upright standards 24 and 25 is a mechancally operated electrical switch LS16 and a like electrical switch mechanically The actuators 286 of the switches LS16 and LS3 extend upwardly in adjacent position to the lower flight of one of the apron chains 252 on which is provided appropriate actuator lugs 288 and 289, the actuator lug 288 being effective to contact the actuator 286 of the switch LS16 and the actuator lug 289 being effective to contact the actuator 286 of the switch LS3. The actuator lug 288 contacts the actuator 286 of the switch LS16 when the apron assembly A is in its retracted most position and serves to stop the motor 269 while the actuator lug 289 contacts the actuator 286 of the limit switch LS3 when the apron assembly A is in its forwardmost position to reverse the motor 269.

Compression and Release Assembly

Referring to FIGS. 7 and 10, it will be seen that the channel members 262 extending between the upright standards 21 and 22, 23 and 24, have a forward portion 290 and a rear upstanding portion 291 adjacent the rear side of the upright standards 22 and 25. The channel members 262 define a roller runway recess 292 in the sides thereof extending along the length thereof. The forwardmost extending ends of the channel members 262 are joined by a transverse connecting member 294. The longitudinal connecting members 33 and 37 extend forwardly of the upright standards 21 and 24 a distance equal to that which the channel members 262 extend forwardly past the upright standards 21 and 24. The members 33 and 37 are joined at their forwardmost ends by a transverse connecting member 295. A short upright connecting standard 296 joins the outer end of the member 37 with the forward end of the channel member 262.

Carried between the forward portions 290 of the channel members 262 is a front compression assembly 298 having a frame 299 with a roller assembly 300 on each side thereof effective to be received in the roller runway recesses 292 in the forward portions 290 of the channel members 262. The frame 299 comprises a pair of longitudinally extending end plates 301 having their rearmost extending ends joined by transverse connecting member 302 so that the longitudinally extending end plates 301 are positioned adjacent to and parallel with the forward extending portions 290 of channel members 262.

The roller assembly 300 associated with each longitudinally extending end plate 301 comprises a pair of rollers 304 rotatable about a horizontal axis and carried by the end plates 301 so that the rollers 304 rest in the bottom of the recess 292. A second pair of rollers 305 is also carried by each end plate 301 and is positioned so that they rotate about a vertical axis. The end plates 301 position the rollers 305 so that they rest against the channel member 262 to maintain the frame 299 in proper alignment. Therefore, it can be seen that the frame 299 is freely movable longitudinally along the stacking machine.

A front transversely extending compression plate 306 is effective, when moved rearwardly along the stacking machine, to engage articles that have been moved into the elevator shaft S by the apron assembly A and, in conjunction with the rest of the compression release assembly, is effective to maintain the articles in a predetermined location. An air cylinder 308 is carried on the transverse connecting member 294 at the front of the stacking machine and has its piston rod 309 connected to the frame 299 to selectively extend and retract the front compression plate 306 into and away from the elevator shaft S. The air cylinder 308 is connected to the air line 207 through an electrically operated air valve 310 which serves to selectively extend and retract the piston rod 309 so as to extend and retract the front compression plate 306.

The front compression assembly 298 is also effective to activate a rear compression assembly 311 through a linkage mechanism 312 connecting the front compression assembly 298 with rear compression assembly 311. The linkage assembly 312 comprises a first pair of links 314 pivotably carried by the axles of the rear rollers 304 carried by the longitudinally extending end plates 301. The link 314 extends upwardly therefrom to connect with one extending end of an intermediate transfer link 135 at its upper extending end. The connection between the extending end of the first link 314 and the intermediate transfer link 315 is a pin connection to permit free pivotable movement between the first link 314 and the intermediate transfer link 315.

The intermediate transfer link 315 is pinned at its midpoint to the adjacent channel member 262 as at 316 so that movement of the upwardly extending end of the intermediate transfer link 315 causes a corresponding reverse movement in the lower extending end of the intermediate transfer link 315. A second link 318 is pivotably pinned to the lower end of the intermediate transfer link 315 and extends upwardly therefrom to carry a support shaft 319 of the rear compression assembly 311 at its upper extending end.

A track follower roll 320 is rotatably carried by the support shaft 319 on the outer ends thereof extending through the upwardmost extending ends of the second link 318 so as to be rotatably received in the rearward upstanding portion of the roller runway recesses 292 in the channel members 262. This is effective to locate the position of the upper extending end of the second links 318 as they are moved by the front compression assembly 298 through the first link 314 and the intermediate link 315.

A rear compression bar 321 is rotatably carried on the support shaft 319 between the second links 318 so that when the front compression assembly 298 moves the upper extending end of the first link 314 rearwardly, the lower end of the second link 318 is moved forwardly by the transfer link 315 to cause a corresponding lowering of the rear compression bar 321 as the track follower rolls 320 move down the vertically extending portions of the roller recesses 292. As the forward lower ends of the second link 318 are moved forwardly, the track follower rolls 320 reach the lowermost end of the vertical portion of the roller runway recesses 292 in the channel members 262 and move into the horizontally extending portions of the roller runway recesses 292 through a transfer section 322 so that the rear compression bar 321 is moved downwardly and then forwardly to contact the rearmost portion of the articles that have been advanced into the elevator shaft S on the apron assembly A. Therefore, it will be seen that the articles are held within the elevator shaft S by the front compression plate 306 and the rear compression bar 321 when the front compression assembly 298 is extended.

The sides of the articles positioned within the elevator shaft S by the apron assembly A are held in position by the side compression assembly 324. Referring to FIG. 10, it will be seen that there is a right side compression sub-assembly 325 and a left side compression sub-assembly 326 carried between channel members 328 transversely extending between the upper ends of the upright standards 21 and 24, and 22 and 25, respectively. Since the left and right side compression sub-assemblies 325 and 326 are mirror images of each other, only the right side compression sub-assembly 325 will be described in detail and the corresponding components of the left side compression sub-assembly 326 will be indicated by primes of the reference numerals applied to corresponding parts of the right side of the compression sub-assembly 325.

Referring now in detail to the right side compression sub-assembly 325, it will be seen to comprise a frame 329 carrying a side compression plate 330 and having a roller assembly 331 mounted at each end thereof which movably mounts the compression sub-assembly 325 in an appropriate roller recess 332 in each of the channel members 328. The frame 329 comprises a longitudinally extending support channel 334 having spaced vertically downwardly extending plate supports 335 attached to the underside of the channel 334 onto the lower inside portion of which is attached the side compression plate 330.

The roll assembly 331 comprises transversely extending end plates 336 and have attached to the side thereof a pair of support rollers 338 rotatable about a horizontal axis and resting on the lower wall of roller recesses 332. A pair of alignment rollers 339 are also carried by each end plate 336 and contact the side of the channel members 328 as they rotate about their vertical axis to maintain the frame 329 in alignment perpendicular to the transverse extending channel members 328. It will be seen that the roller assembly 331 allows the frame 329 to be easily moved transversely of the stacking machine. A conventional rack and pinion arrangement 340 attached to the support channels 334 and 334' serve to connect the right and left side compression sub-assemblies 325 and 326 so that movement of one of the side compression sub-assemblies 325 or 326 results in a corresponding opposite movement of the other side compression sub-assembly 325 or 326.

An air cylinder 341 fixedly mounted to the underside of the longitudinal connecting member 33 and centrally located between upright standards 21 and 22 has its piston rod 342 connected to the support channel 334' of the left side compression sub-assembly 326 so as to selectively extend and retract the left side compression sub-assembly 326 as the piston of the air cylinder 341 is extended and retracted. Since the side compression plates 330 and 330' are aligned in approximately the same plane as the front compression plate 306, it will be seen that extending the front compression plate 306 and the side compression plates 330 and 330' along with the rear compression bar 321 serves to fixedly locate articles advanced to the elevator shaft S on the apron assembly A. The air cylinder 341 is connected to the solenoid air valve 310 so that when the air cylinder 308 is activated to extend the front compression plate 306 and the rear compression bar 321, the side compression plates 330 and 330' will also be extended.

Figure 13:
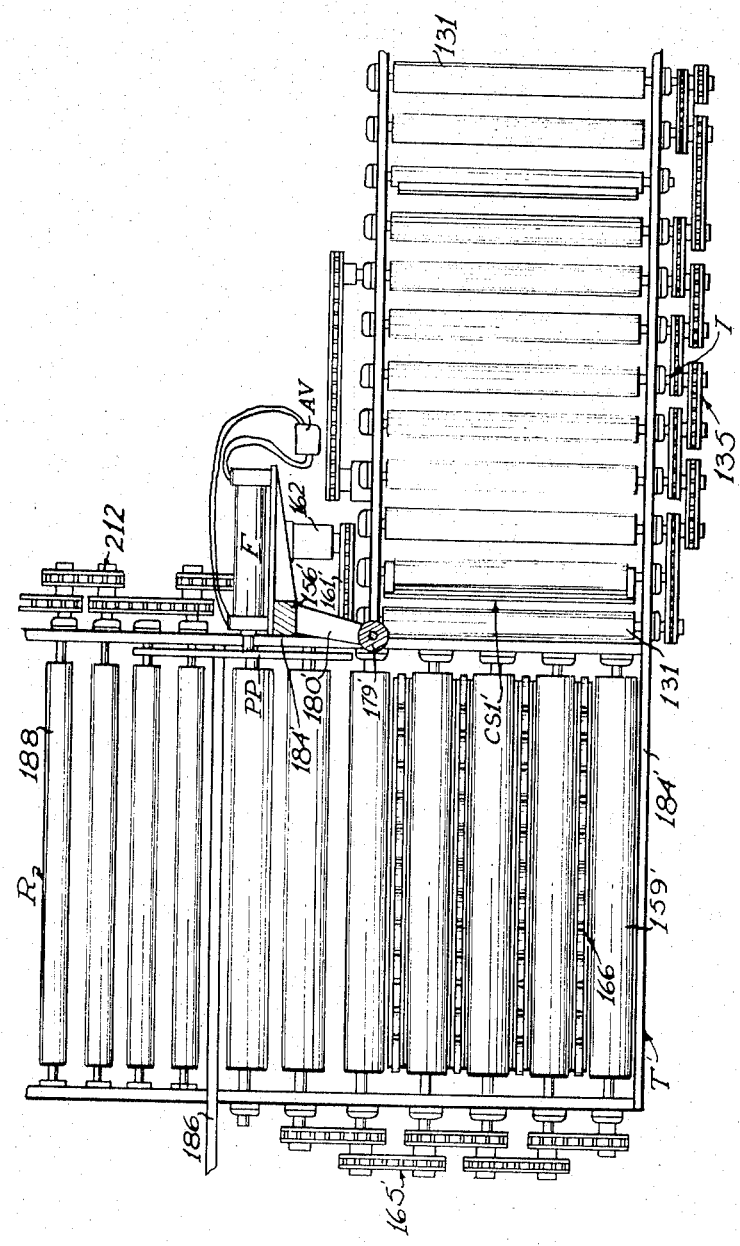
FIG. 13 is a partial top elevational view of a second embodiment of the turning section of the stacking machine shown in FIG. 1 showing the alignment mechanism therefor.

Referring to FIG. 13, it will be seen that the second embodiment of the turning section herein referred to as T' includes an extension of 184' on the roll support beam 184 which connects the roll support beam 184 with the roll support beam 129. The forwardmost two rolls 131 of the infeed roll section I have been deleted and the rolls 159' corresponding to the rolls 159 in the turning section T are of the same length as the rolls 188. The transmission 162 is driven through a chain and sprocket arrangement 161' connecting the transmission 162 and the forwardmost roll 131 of the infeed roll section I. Case stop CS-1' has been moved rearwardly in the infeed roll section I so that the case stop CS-1' is carried by the next to the forwardmost roll 131 of the infeed roll section I. The case stop CS-1' operates in the same manner as the case stop CS-1. Intermediate upright standard 156 has been replaced by an intermediate upright standard 156' positioned just rearwardly of the roll support beam 184, and the turning roll 179' with its accompanying mounting plates 180' have been moved rearwardly to join with the upright standard 156'. The rolls 159' are driven in the same manner as the rolls 159 in the first embodiment of the invention through the chain and sprocket arrangement 165'.

An air cylinder F is carried by the upright standard 156' and has its forwardly extending piston rod F' connected to a push plate PP carried just above the turning rolls 159'. The push plate PP is effective to engage articles that have been turned by the turning section T' and slide them forwardly to the other side of the turning section T' so that a subsequently entering article from the infeed roll section I can be turned to give side-by-side arrangement of the turned articles. Therefore, it will be seen that when a first article is turned in the turning section T', an air valve AV which is solenoid operated is effective to extend the push plate PP forwardly to displace the article toward the front of the turning section T'. This is effective to place the article far enough forward in the cross feed roll section R to allow the next article turned in the turning section T' to be placed rearwardly of the first displaced article on the cross feed roll section R.

Electrical Circuit

Figure 14:
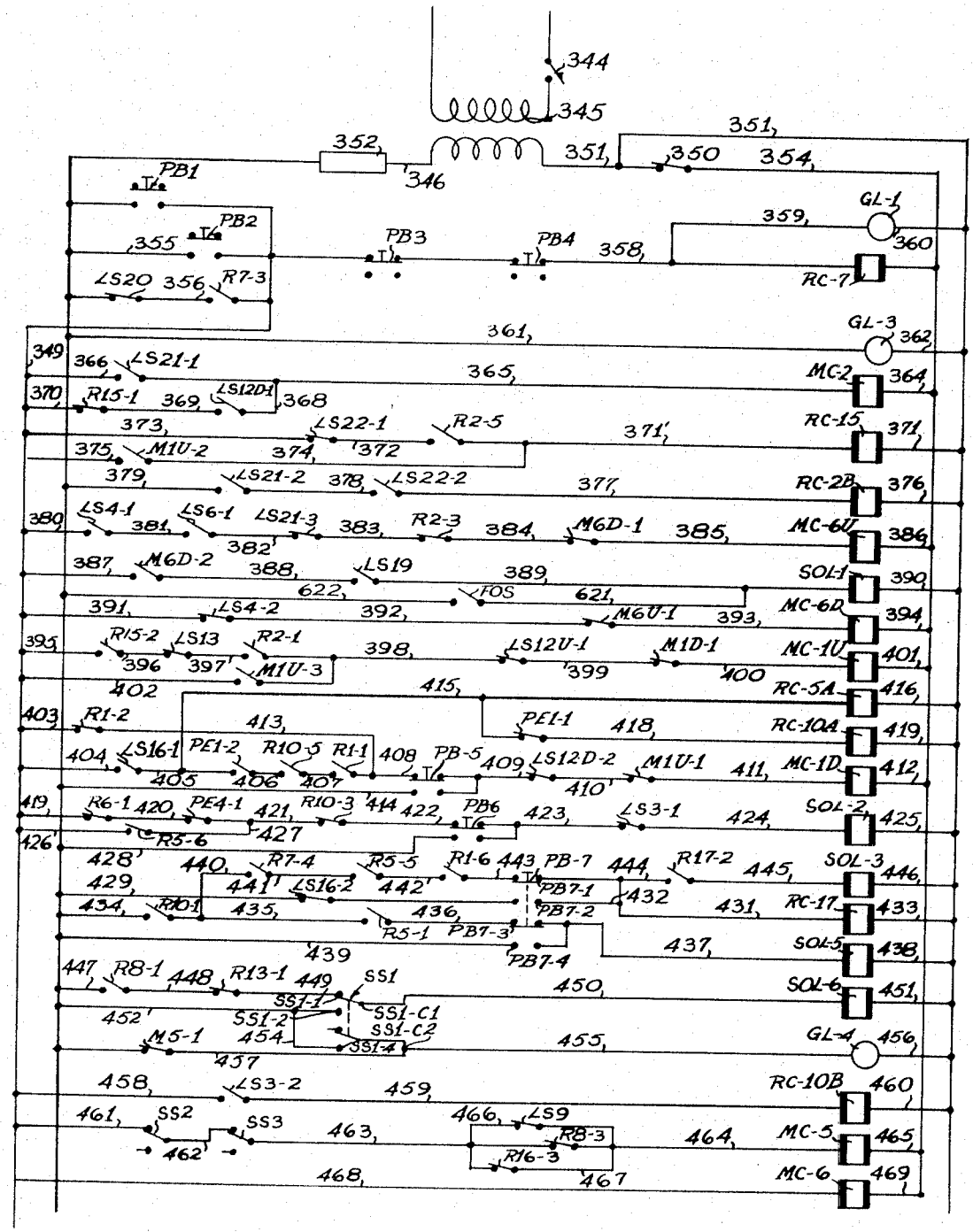
FIG. 14 is a partial schematic representation of the control circuit of the stacking machine shown in FIG. 1.
Figure 15:
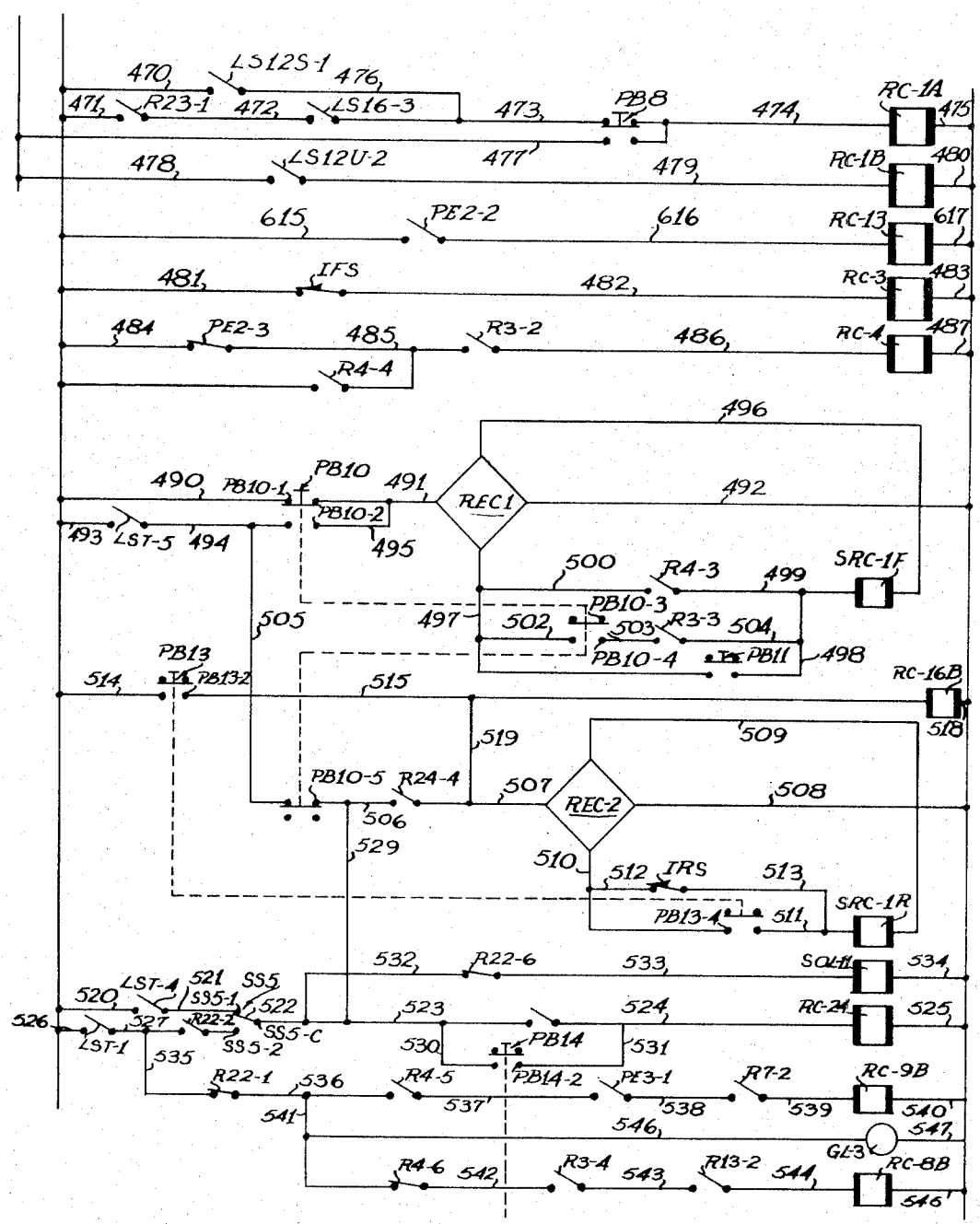
FIG. 15 is a partial schematic representation of the control circuit of the stacking machine of FIG. 1.
Figure 16:
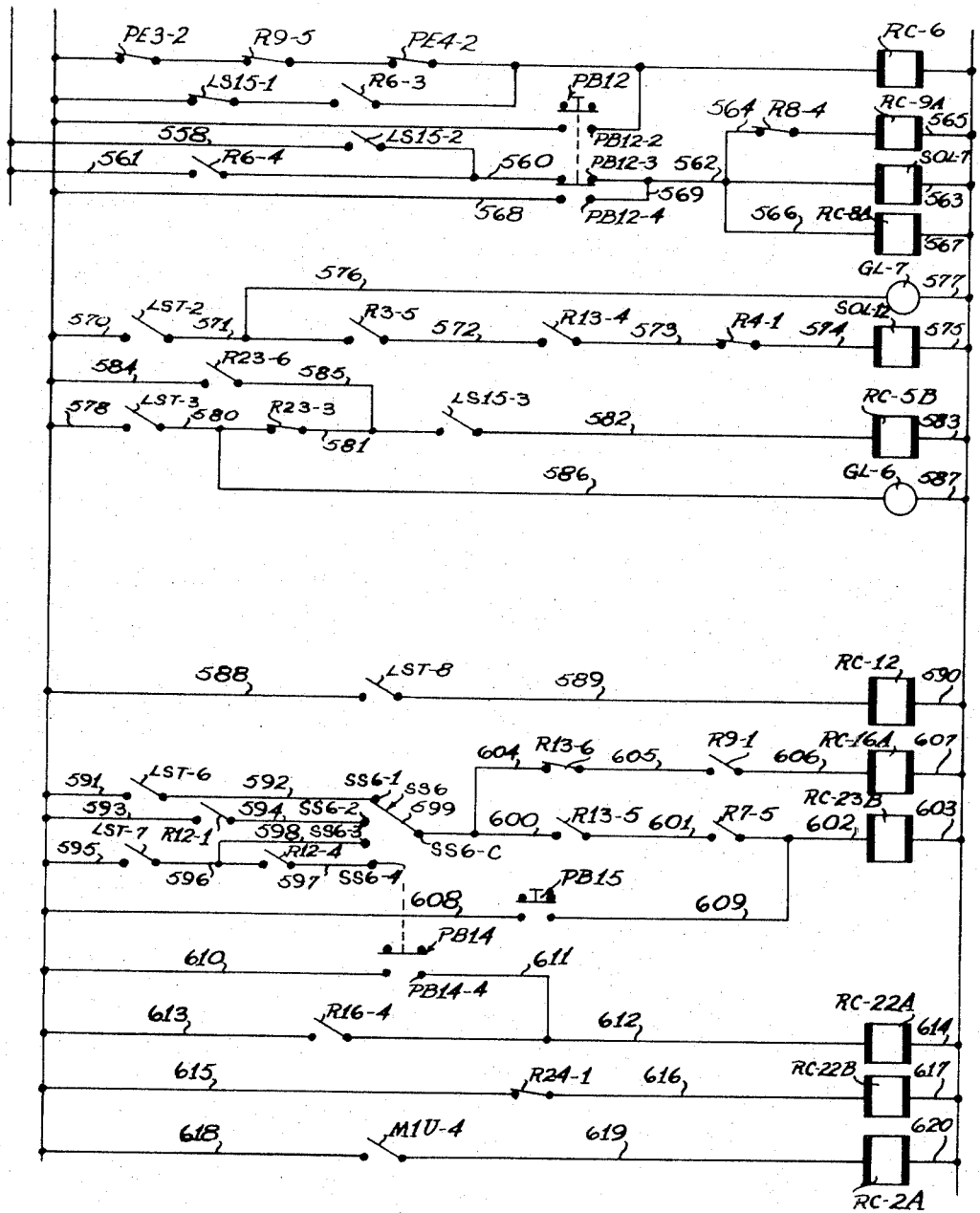
FIG. 16 is a partial schematic representation of the control circuit for a stacking machine shown in FIG. 1 showing the remainder of the control circuit not shown in FIGS. 14 and 15.

In FIGS. 14, 15 and 16 of the accompanying drawings is the wiring diagram for our stacking machine, the wires connecting the various switches, motors and related equipment being deleted in the previous drawings. In FIG. 14 it will be seen that I have provided a control circuit having circuit breaker 344, which when on, supplies current from a conventional plant power source of 440 or 220 volts A.C. into 110 volts A.C. On the 110 volts side of the transformer 345 is a common hot wire 346 and a common ground 351. The common ground 351 is connected to a second common ground 354 through a plurality of overload switches 350.

The common hot wire 346 is connected to a common hot wire 348 through a fuse 352 which is connected to a second hot wire 349 through a start switch PB-1. The common hot wire 348 is also connected to the second hot wire 349 through a second start switch PB-2 interposed in wire 355. Also connecting hot wire 348 with the second hot wire 349 is a wire 356 having interposed therein, in series, the normally closed contacts of the switch LS20 and the normally open switch contacts Ru-3 of a switching relay R7.

Connecting the second ground 354 to the second hot wire 349 is a wire 358 having interposed therein, in series, the normally closed contacts of stop switch PB-3, the normally closed contacts of stop switch PB-4 and a relay coil RC7 of the switching relay R7. The stop switches PB-3 and PB-4 are normally closed so that current supplied to the coil RC-7 from the second hot wire 349 passes along wire 358 through the stop switches PB-4 and PB-3 through wire 355 and 354 to the common ground 351 if start switch PB-1 or start switch PB-2 is depressed closing their normally open contacts. When coil RC-7 is activated by the passage of current therethrough, the contacts R7-3 in the wire 356 are closed thereby establishing a ground with common ground 351 to insure constant system operation until stop switch PB-3 or PB-4 is depressed. Also, upon an overload of the elevator E, the switch LS20 will be opened which will also stop the operation of the machine. Current is supplied to glow light GL-1 through wire 360 connected to common ground 351 and through wire 359 connecting the other side of the glow light GL-1 to the wire 358 which in turn is connected to the common ground 351. The glow light GL-1 indicates when the machine is on automatic control and will continue to be lighted until the stop switches PB-3 or PB-4 are open. This portion of the circuit comprises the automatic switching section.

A wire 361 connects to the common hot wire 348 supplies current to a glow light GL-3 which is connected to common ground 351 through a wire 362. The glow light GL-3 is illuminated as long as the circuit breaker 344 is closed thereby indicating that the power to the machine is on. This is the power indicator portion of the control circuit for the stacking machine.

Wire 366 connects common hot wire 349 with one of the normally open switch contacts LS21-1 of the limit switch LS21 and the other contact LS21-1 is connected to one side of relay coil MC-2 of control relay M2 through wire 365. The other side of coil MC-2 is connected to common ground 354 through wire 364 so that when contacts LS21-1 are closed, the relay coil MC-2 is energized. The control relay M2 is associated with the motor drive unit 81. Wire 368 connects wire 365 with one of the normally open contacts LS12D-1 of the down limit switch LS12D and the other contact LS12D-1 is connected to one of the normally closed contacts R15-1 of a time delay switching relay R15 through wire 369. The other contact R15-1 is connected to common hot wire 349 through wire 370. Therefore, it can be seen that relay coil MC-2 may be activated by closing either the normally open contacts LS21-1 or the normally open contacts LS12D-1 since the contacts R15-1 are normally closed. Energizing relay coil MC-2 serves to start the motor drive unit 81 to start the feed chains 86 and 95 of the pallet transfer mechanism moving. This comprises the pallet feed section of the control circuit.

The common ground 351 is connected to one side of relay coil RC-15 of a switching relay R15 through wire 371 and the other side of the relay coil RC-15 is connected to one of the normally open contacts R2-5 through a wire 371'. The other contact R2-5 is connected to one of the normally closed contacts LS22-1 of switch LS22 through wire 372 and the other contact LS22-1 is connected to the common hot wire 349 through wire 373. Since the contacts R2-5 are normally open and the contacts LS22-1 are normally closed, it will be seen that when contacts R2-5 are closed, relay coil RC-15 is energized. Normally open contacts M1U-2 of the main drive control relay M1 are connected to wire 371' through wire 374 and to common hot wire 349 through wire 375. Therefore, it can be seen that when normally open contacts M1U-2 are closed, the relay coil RC-15 may also be energized. This comprises the pallet feed control portion of the control circuit.

One side of relay coil RC-2B of the switching relay R2 is connected to the common ground 351 through the wire 376 and the other side thereof is connected to one of the normally open contacts LS22-2 of the limit switch LS22 through wire 377. The other contact LS22-2 is connected through wire 378 to one of the normally open contacts LS21-2, the other contact of which is connected to common hot wire 348 through wire 379. Since contacts LS21-2 and LS22-2 are normally open, relay RC2B will not be energized until both switches LS21 and LS22 are activated. These switches are activated when the pallet elevator 68 is down and a pallet is on the feed chains 88. Energizing RC-2B serves to stop the feed chains 86 and 95 after a predetermined period of time. This portion of the control circuit serves to stop the motor drive unit 81.

Common hot wire 349 is connected to one of the normally open contacts LS4-1 of the limit switch LS4 through wire 380, the other contact LS4-1 being connected to one of the normally open contacts LS6-1 of the limit switch LS-6 through wire 381. The other contact LS6-1 is connected to one of the normally closed contacts LS21-3 of limit switch LS21 through wire 382 and the other contact LS21-3 is connected to one of the normally closed contacts R2-3 of the switching relay R2 through wire 383. The other contact R2-3 is connected to one of the normally closed contacts M6D-1 of the motor control relay M6 through wire 384 and the other contact M6U-1 is connected to one side of the relay coil MC-6U of the motor control relay M6, the other side of the relay coil MC-6U being connected to common ground 354 through wire 386. When limit switch LS21 has been cleared so that contacts LS21-3 are in their closed positions and limit switches LS4-1 and LS6-1 are closed, the pallet elevator motor drive unit 101 is started to propel the pallet elevator 68 up. Since LS6 is closed when pallets are in the pallet magazine and LS4 is closed until the pallet elevator 68 reaches its upper limit, the pallet elevator 68 will be moved up by the motor drive unit 101 until the limit switch LS4 is activated to open the switch contacts LS4-1 and stop the motor drive unit 101. This portion of the control circuit is the pallet elevator energization section.

Connecting the hot wire 349 with one of the normally open contacts M6D-2 of the motor control unit M6 is a wire 387 and connecting the other contact M6D-2 with one of the normally open contacts of limit switch LS19 is a wire 388. The other contact of the switch LS19 is connected to one side of a solenoid SOL-1 of the air valves 59 and 66 which control the air cylinders 58 and 65 of the pallet retainers 52 and 54, the other side of which is connected to common ground 351 through wire 390. It will thus be seen that when switch contacts MD6-2 and the contacts of limit switch LS19 are closed, the solenoid SOL-1 is energized which serves to retract the pallet retainers 52 and 54 so as to allow the pallets contained with the pallet magazine 46 to be carried by the pallet elevator 68. As the pallet elevator 68 is lowered, the contacts of limit switch LS19 are opened which deenergizes the solenoid SOL-1 and allows the pallet retainers 52 and 54 to extend to engage the next to the lowermost pallet contained in the pallet magazine 46. This portion of the circuit is the pallet retainer control section.

Connecting hot wire 349 with one of the normally closed contacts LS4-2 of the limit switch LS4 is a wire 391 and connecting the other contact LS4-2 with one of the normally closed contacts M6U-1 of the motor control relay M6 is a wire 392. Connecting the other contact M6U-1 with one side of the relay coil MC-6D is a wire 393 and connecting the other side of the relay coil MC-6D with common ground 354 is a wire 394. Therefore, it will be seen that since the limit switch LS4 is a two position switch activated by the upward movement of the pallet elevator 68 serves to close the contacts LS4-2 which causes the pallet elevator 68 to begin its downward movement since relay M6D reverses the motor drive unit 101. When the elevator 68 reaches its lowermost position, switch LS4 is activated so as to open contacts LS4-2 and stop the 41 drive unit 101. This portion of the circuit controls the downward movement of the pallet elevator 68.

A wire 395 connects common hot wire 349 with one of the normally open contacts R15-2 and wire 396 connects the other contact R15-2 with one of the normally closed contacts of limit switch LS13. Connecting the other contact of the switch LS13 with one of the normally open contacts R2-1 is a wire 397 and connecting the other contact R2-1 with one of the normally closed contacts LS12U-1 of the limit switch LS12U is a wire 398. The other contact LS12U-1 is connected to one of the norma ly closed contacts M1D-1 of normally control relay M1 through wire 399 and the other contact M1D-1 is connected one side of the relay coil MC-1U of the control relay M1 through wire 400. A wire 401 connects the other side of the relay coil MC-1U with the common ground 354 so that when contacts R15-2 and contacts R2-1 are closed, the elevator motor drive unit 119 is activated to propel the main elevator E upwardly. Connecting the common hot wire 349 with the wire 398 is a wire 402 in which is interposed the normally open contacts M1U-3 of the motor control relay M1. Therefore, it can be seen that closing the contacts M1U-3 or closing the contacts R15-2 and R2-1 will serve to energize the relay coil MC-1U to move the elevator E upwardly. The upward movement of the elevator is stopped when contacts LS12U-1 are opened to deenergize the relay coil MC-1U. This portion of the circuit controls the upward movement of the main elevator E.

Common hot wire 349 is connected to one of the normally closed contacts R1-2 of the switching relay R1 through wire 403, and hot wire 349 is connected to one of the normally opened contacts LS16-1 through wire 404. The other contact LS16-1 is connected to one of the normally open contacts PE1-2 of the photoelectric switch PE1 and the other contact PE1-2 is connected to one of the normally open contacts R10-5. The other contact R10-5 is connected to one of the normally open contacts R1-1 through wire 407 and the other contact R1-1 is connected to one of the normally closed contacts of the push-button switch PB-5 through wire 408. The other contact of the switch PB-5 is connected to one of the normally closed contacts LS12D-2 of the limit switch 12D through wire 409 and the other contact LS12D-2 is connected to one of the normally closed contacts M1U-1 of the control relay M1 through wire 410. Connecting the other contact M1U-1 with one side of the relay coil MC-1D is wire 411 and wire 412 connects the other side of the relay coil MC-1D to common ground 354. Wire 413 connects the other contact R1-2 with wire 408 so that relay coil MC-1d may be activated either through normally closed contacts R1-2 or through normally open contacts LS16-1, PE1-2, R10-5 and R1-1. A wire 414 connects common hot wire 348 with wire 409 and has interposed therein the normally open contacts of switch PB-5 so that relay coil MC-1D also may be activated by the depressing of the switch PB-5 to connect the relay coil MC-1D with common hot wire 348. This portion of the control circuit serves to control the downward movement of the main elevator E.

Wire 415 connects wire 405 with one side of relay coil RC-5A, the other side of which is connected to common ground 351 through wire 416. Therefore, it will be seen that when switch contacts LS16-1 are closed, relay coil RC-5A is energized. Connecting wire 415 with one of the normally closed contacts PE1-1 is a wire 417 and connecting the other contact PE1-1 with one side of a relay coil RC-10A is a wire 418. The other side of the relay coil RC-10A is connected to common ground 351 through wire 419 so that closure of contacts LS16-1 serve to energize relay coil RC-10A unless contacts PE1-1 are open. That portion of the circuit associated with relay coils RC-5A and RC-10A serve to control the apron assembly A.

Wire 419 connects common hot wire 349 with one of the normally closed contacts R6-1 of switching relay R6 and wire 420 connects the other contact R6-1 with one of the normally open contacts PE4-1 of the photoelectric switch PE-4. The other contact PE4-1 is connected to one of the normally closed contacts R10-3 of switching relay R10 through wire 421 and wire 422 connects the other contact R10-3 with one of the normally closed contacts of push-button switch PB6. The other contact of the switch PB6 is connected through wire 423 of one of the normally closed contacts LS3-1 of limit switch LS3. The other contact LS3-1 is connected through wire 424 to one side of solenoid SOL-2 and wire 425 connects the other side of the solenoid SOL-2 with common ground 351. Wire 426 connects common hot wire 349 with one of the normally open contacts R5-6 and wire 427 connects the other contact R5-6 with wire 421. Therefore, it can be seen that solenoid SOL-2 may be activated either by closing contacts PE4-1 or by closing contacts R5-6. Wire 348 is connected to wire 423 through wire 428 having interposed therein the normal open contacts of push-button switch PB-6 so that solenoid SOL-2 may also be activated simply by depressing switch PB-6. Activation of solenoid SOL-2 serves to supply air to the air motor 269 to propel the apron assembly A forward to close. This portion of the circuit, then, controls the closing of the apron assembly A.

Connecting common hot wire 348 with one of the normally closed contacts LS16-2 of the limit switch LS16 is wire 429 and connecting the other contact LS16-2 with one of the normally open contacts PB7-2 of push-button PB-7 is wire 430. Connecting the other contact PB7-2 with wire 431 is wire 432, wire 431 being connected to relay coil RC-17 which is in turn connected to common ground 351 through wire 433. Therefore, it will be seen that when push-button switch PB-7 is depressed, relay coil RC-17 will be activated to control the opening of the apron assembly A.

Wire 434 connects common hot wire 348 with one of the normally open contacts R10-1 of the switching relay R10 and wire 435 connects the other contact R10-1 with one of the normally open contacts R5-1 of the switching relay R5. The other contact R5-1 is connected to one of the normally closed contacts PB7-3 of the push-button switch PB-7 and through wire 436 and wire 437 connects the other contact PB7-3 with one side of solenoid SOL-5. The other side of solenoid SOL-5 is connected to common ground 351 through wire 438 so that when contacts R10-1 and R5-1 are closed, solenoid SOL-5 is energized to supply air to the air cylinders 308 and 341, to cause a layer of articles contained on the advanced apron assembly A to be compressed for depositing on a pallet carried by the main elevator E. Wire 439 connects common hot wire 348 with wire 437 through normally open contacts PB7-4 so that the solenoid SOL-5 may be energized by the pressing switch PB-7.

Wire 440 connects wire 435 with one of the normally open contacts R7-4 of the relay R7 and wire 441 connects the other contact R7-4 with one of the normally open contacts R5-5. The other contact R5-5 is connected to one of the normally open contacts R1-6 through wire 442 and wire 443 connects the other contact R6-1 with one of the normally closed contacts PB7-1 of push-button switch PB-7. Wire 444 connects the other contact PB7-1 with one of the normally open contacts R17-2 of the time delay relay R17 and wire 445 connects the other contact R17-2 with one side of solenoid SOL-3. The other side of solenoid SOL-3 is connected to the common ground 351 through wire 446 so that when contacts R7-4, R5-5, R1-6 and R17-2 are closed, solenoid SOL-3 will be activated to supply air to the air motor 269 to cause the apron assembly to be open. Wire 431 is also connected to wire 444 so that when contacts R7-4, R5-5 and R1-6 are closed, relay coil RC-17 is energized to close switch contacts R17-2 to energize solenoid SOL-3. This portion of the circuit serves to control the opening of the apron assembly A.

Wire 447 connects one of the normally open contacts R8-1 with common hot wire 348 and wire 448 connects the other contact R8-1 with one of the normally closed contacts R13-1 of switching relay R13. Wire 449 connects the other contact R13-1 with the normally closed contact SS-1 of selector switch SS-1 and wire 450 connects the common contact SS1-C1 with one side of solenoid SOL-6. The other side of solenoid SOL-6 is connected to common ground 351 through wire 451 so that when contacts R8-1 are closed, solenoid SOL-6 will be energized to supply air to the air cylinder 142 and will raise case stop CS-1. Wire 452 connects common hot wire 348 with the normally open contact SS1-2 of sleector switch SS1. Therefore, it can be seen when selector switch SS1 is positioned ss that contacts SS-2 and SS1-C1 are closed by switch arm SS1-A1, contacts S8-1 and R13-1 are bypassed through wire 452 to energize solenoid SOL-6 and raise case stop CS-1. Wire 454 connects wire 452 with the normally open contact SS1-4 of selector switch SS1 and wire 455 connects the common contact SS1-C2 with one side of the glow light GL-4. The other side of the glow light GL-4 is connected to common ground 351 through wire 456 so that when selector switch SS1 is transferred so as to close contacts SS1-4 and SS1-C2, the glow light GL-4 will be illuminated at all times. Wire 457 connects wire 455 with common hot wire 348 through normally closed contacts M5-1 so that glow light GL-4 will be illuminated independently of selector switch SS1 as long as contacts M5-1 are closed. This portion of the circuit controls the case stop CS-1 and glow light GL-4 indicates when the incoming line of articles has been stopped by case stop CS-1.

Connecting common hot wire 349 with one of the contacts LS3-2 of limit switch LS3, normally open, is wire 458 and wire 459 connects the other contact LS3-2 with one side of relay coil RC-10B which in turn is connected to common ground 351 through wire 460. Therefore, it will be seen that when limit switch LS3 is activated so as to close contacts LS3-2, relay coil RC-10B will be energized thereby stopping the apron assembly A from further closing. Wire 461 connects common hot wire 349 with the normally closed contact of selector switch SS2, the common contact of connector switch SS2 being connected to the normally closed contact of selector switch SS3 through wire 462. The common contact of selector switch SS3 is connected to one of the normally closed contacts RS-3 of the relay R8 through wire 463 and wire 464 connects the other contact R8-3 with one side of relay coil MC-5 of the control relay M5 associated with the motor drive unit 151. The other side of the relay coil MC5 is connected to common ground 354 through wire 465. Therefore, it will be seen that relay coil MC-5 is normally energized so that the infeed conveyor motor drive unit 151 is operating the infeed conveyor belt C. Wire 463 is also connected to wire 464 through wire 466 having interposed therein the normally closed contacts of limit switch LS9. Therefore, it will be seen that coil MC5 will be energized independently of the normally closed contacts R8-3 through switch LS-9. Also connecting wire 463 with wire 464 is a wire 467 having interposed therein the normally closed contacts R16-3 of switching relay R16 so that relay coil MC5 will be energized independently of the normally closed contacts of limit switch LS9 and the normally closed contacts R8-3. This portion of the circuit serves to control the motor drive unit 151 associated with the infeed conveyor belt B.

A wire 468 connects hot wire 349 with one side of relay coil MC-4 of the motor control relay M4 and wire 469 connects the other side of the relay coil MC-4 to common ground 354. Therefore, it will be seen that the relay coil MC-4 is activated as long as a circuit is completed through hot wire 349 so that the infeed roll section I is continuously powered by the motor drive unit 132.

Referring to FIG. 15, it will be seen that wire 470 connects common hot wire 348 with one of the normally open contacts LS12S-1 of limit switch LS12S and common hot wire 348 is connected through wire 471 to one of the normally open contacts R23-1 of switching relay R23. Wire 472 connects the other contact R23-1 with one of the normally open contacts LS16-3 of the limit switch LS16 and wire 473 connects the other contact LS16-3 with one of the normally closed contacts PB8-1 of push button switch PB8. The other contact PB8-1 is connected to one side of relay coil RC-1A through wire 474 and wire 475 connects the other side of relay coil RC-1A with common ground 351. A wire 476 connects the other contact LS12S-1 with wire 473 and wire 477 connects common hot wire 349 with wire 474 through normally open contacts PB8-2 of push-button switch PB8. Wire 478 connects common hot wire 349 with one of the normally open contacts LS12U-2 of limit switch LS12U and wire 479 connects the other contact LS12U-2 with one side of relay coil RC-1B. The other side of relay coil RC-1B is connected to common ground 351 through wire 480. This portion of the control circuit serves to control the movement of the main elevator E.

Wire 615 connects common hot wire 348 with one of the normally open contacts PE2-2 of the photoelectric switch PE2 and wire 616 connects the other contact PE2-2 with one side of relay coil RC-13 of the switching relay R13. The other side of relay coil RC-13 is connected to common ground 351 through wire 617 so that relay coil RC-13 is energized when the contacts PE2-2 are closed. This portion of the control circuit serves as the activator to cause the tape reader to step the numerical control tape forward one step and to control the stack height selectors to cause the main elevator E to descend.

Wire 348 is connected to one of the normally closed contacts of the interrupter forward switch IFS through wire 481 and the other contact thereof is connected to one side of relay coil RC-3 through wire 482. The other side of relay coil RC-3 is connected to common ground 351 through wire 483. Wire 484 connects common hot wire 348 with one of the normally closed contacts PE2-3 of the photoelectric switch PE2 and wire 485 connects the other contact PE2-3 with one of the normally open contacts R3-2 of the switching relay R3. The other contact R3-2 is connected to one side of relay coil RC-4 of switching relay R4 through wire 486 and wire 487 connects the other side of relay coil RC-4 with common ground 351.

Wire 488 connects common hot wire 348 with one of the normally open contacts R4-4 of switching relay R4 and wire 489 connects the other contact R4-4 with wire 485.

Wire 490 connects common hot wire 348 with one of the normally closed contacts PB10-1 of push-button switch PB10 and wire 491 connects the other contact PB10-1 with one of the A-C inputs of rectifier REC-1. The other A-C input of the rectifier REC-1 is connected to common ground 351 through wire 492. Wire 493 connects common hot wire 348 with one of the normally open contacts of the tape controlled limit switch LST-5 and wire 494 connects the other contact thereof with one of the normally open contacts PB10-2 of push-button switch PB10. Wire 495 connects the other contact PB10-2 with wire 491.

The ground side of the D-C output from rectifier REC-1 is connected to the ground side of relay coil SRC-1F of the forward stepping relay SR-1F through wire 496. The positive D-C output of the rectifier REC-1 is connected to one of the normally open contacts of push-button switch PB11 through wire 497 and the other contact of switch PB11 is connected through wire 498 to a wire 499 connecting the positive side of relay coil SRC-1F with one of the normally open contacts R4-3 of switching relay R4. Wire 500 connects the other contact R4-3 with one of the normally open contacts R13-3 of the switching relay R13 and wire 501 connects the other contact R13-3 with wire 497. Wire 502 connects wire 497 with one of the normally open contacts PB10-4 of the push-button switch PB10 and wire 503 connects the other contact PB10-4 with one of the normally open contacts R3-3. Wire 504 connects the other contact R3-3 with wire 498. Therefore, it will be seen that the relay coil SRC-1F may be energized by either closing contacts R13-3 and R4-3 or by closing push-button switch PB10 and contacts R3-3 or by closing push-button switch PB11. This portion of the circuit controls the forward stepping of the tape in the numerical control device N.

Wire 505 connects wire 494 with one of the normally closed contacts PB10-5 and wire 506 connects the other contact PB10-5 with one of the normally open contacts R24-4 of the switching relay R24. Wire 507 connects the other contact R24-4 with one of the A-C inputs of rectifier REC-2, the other A-C input of rectifier REC-2 being connected to common ground 351 through wire 508. Wire 509 connects the ground D-C output of the rectifier REC-2 with the ground side of relay coil SRC-1R of the reverse stepping relay SRC-1R. Wire 510 connects the positive D-C output of the rectifier REC-2 with one of the normally open contacts PB13-4 and wire 511 connects the other contact PB13-4 with the positive side of relay coil SRC-1R. Wire 512 connects wire 510 with one of the normally closed contacts of the interrupter reverse switch IRS and wire 513 connects the other contact of switch IRS with the wire 511. Therefore, it will be seen that relay coil SRC-1R may be energized either by the pressing push-button switch PB13 or by the closing of the contacts of the switch IRS. This portion of the circuit controls the reverse stepping of the numerical control tape in the numerical control device N of the machine.

Wire 514 connects common hot wire 348 with one of the normally open contacts PB13-2 of the push-button switch PB13 and wire 515 connects the other contact PB13-2 with one side of relay coil RC-16B of the switching relay R16. Wire 517 connects the other side of relay coil RC-16B with the common ground 351 and wire 519 connects wire 507 with wire 517. Therefore, it will be seen that relay coil RC-16B may be energized either by closing push-button switch PB13 or by closing contacts R24-4. This portion of the circuit serves to control the resetting of the numerical tape in the numerical control device N.

Wire 520 connects common hot wire 348 with one of the normally open contacts of the tape control limit switch LST-4 and wire 521 connects the other contact of tape control limit switch LST-4 with contact SS5-1 of the selector switch SS5. The switch arm 522 selectively connects contact SS5-1 with the common contact SS5-C of the selector switch SS5 and wire 523 connects the common contact SS5-C with one of the normally open contacts R22-4 of the switching relay R22. The other contact R22-4 is connected to one side of relay coil RC-24 of the switching relay R24 and wire 525 connects the other side of the relay coil RC-24 with the common ground 351. Wire 525 connects common hot wire 348 with one of the normally open contacts of the tape control limit switch LST-1 and wire 527 connects the other contact of switch LST-1 with one of the normally open contacts R22-2 of the switching relay R22. The other contact R22-2 is connected to the contact SS5-2 so that switch arm 522 may selectively connect the contact SS5-2 with the common contact SS5-C. Therefore, it will be seen that relay coil RC-24 may be energized either through switch LST-4 or through switch LST-1 depending upon the position of the switch arm 522 of the selector switch SS5.

Wire 529 connects wire 506 with wire 523 so that relay coil RC-24 may be energized from current supplied to wire 506. Wire 530 connects wire 523 with one of the normally open contacts PB14-2 of the push-button switch PB14 and wire 531 connects the other contact PB14-2 with the wire 524. Therefore, contacts R22-4 may be bypassed when the push-button switch PB14 is depressed. Wire 523 is connected to one of the normally closed contacts R22-6 of the switching relay R22 through wire 532 and wire 533 connects the other contact R22-6 with one side of solenoid SOL-11 which is connected to common ground 351 through wire 534. When the switch LST-4 is closed, the solenoid SOL-11 will be energized to raise case stop CS-3 to define a particular pattern. That portion of the circuit associated with solenoid SOL-11 serves to control the extension and retraction of case stop CS-3.

Connecting wire 527 with one of the normally closed contacts R22-1 of the switching relay R22 is a wire 535 and connecting the other contact R22-1 with one of the normally open contacts R4-5 is a wire 536. Connecting the other contact R4-5 with one of the normally open contacts PE3-1 of the photoelectric switch PE3 is a wire 537 and wire 538 connects the other contact PE3-1 with one of the normally open contacts R7-2. The other contact R7-2 is connected to one side of the relay coil RC-9B through wire 539 and the other side of relay coil RC-9B is connected to common ground 351 through wire 540. Wire 541 connects wire 536 with one of the normally closed contacts R4-6 of the switching relay R4 and wire 542 connects the other contact R4-6 with one of the normally oepn contacts R3-4 of the switching relay R3-4. The other contact R3-4 is connected to one of the normally open contacts R13-3 of the switching relay R13 through wire 543 and wire 544 connects the other contact R13-3 with one side of relay coil RC-8B of the switching relay R-8. The other side of relay coil RC-8 is connected to the common ground 351 through wire 545. Connecting wire 541 with one side of the glow light GL-3 is a wire 546 and wire 547 connects the other side of the glow light GL-3 to the common ground 351. This portion of the circuit serves to control the rake mechanism M and case stop CS-1.

Connecting wire 348 with one of the normally closed contacts PE3-2 of the photoelectric switch PE3 is a wire 548 and connecting the other contact PE3-2 with one of the normally open contacts R9-5 is a wire 549. Connecting the other contact R9-5 with one of the normally closed contacts PE4-2 of the photoelectric switch PE4 is a wire 550 and wire 551 connects the other contact PE4-2 with one side of relay coil RC-6 of the switching relay R6. The other side of the relay coil RC-6 is connected to common ground 531 through wire 552. Connecting wire 348 with one of the normally closed contacts LS15-1 of the limit switch LS15 is wire 553 and wire 554 connects the other contact LS15-1 with one of the normally open contacts R6-3 of the switching relay R6. The other contact R6-3 is connected to wire 551 through wire 555. Therefore, it will be seen that the relay coil RC-6 may be energized by closing contacts R9-5 or by closing the contacts R6-3.

Wire 556 connects wire 348 with one of the normally open contacts PB12-2 of the push-button switch PB12 and wire 557 connects the other contact PB12-2 with the wire 551 so that relay coil RC-6 may be energized by the pressing switch PB12. Wire 558 connects wire 349 with one of the normally open contacts LS15-2 of the limit switch LS15 and wire 559 connects the other contact LS15-2 with wire 560 connecting the normally open contacts R6-4 with one of the normally closed contacts PB12-3 of the push-button switch PB12. The otheer contact R6-4 is connected to the common ground 349 through wire 561 and the other contact PB12-3 is connected to one side of the solenoid SOL-7, the other side of which is connected to common ground 351 through wire 563. Wire 564 connects wire 562 with one of the normally closed contacts R8-4 of the switching relay R8. The other contact R8-4 is connected to one side of relay coil RC-9A of the switching relay R9 and the other side of the coil RC-9A is connected to ground 351 through wire 565. Wire 566 connects wire 362 with one side of relay coil RC-8A of switching relay R8 and wire 567 connects the other side of relay coil RC-8A with common ground 351. Wire 568 connects common hot wire 348 with one of the normally open contacts PB12-4 of the push-button switch PB12 and wire 569 connects the other contact PB12-4 with wire 562. Therefore, it can be seen that depressing switch PB12 serves to energize relay coils RC-8B and RC-9B as well as solenoid SOL-7 to effectuate the raising of case stop CS-1 and cause the rake-mechanism M to proceed forwardly.

Wire 570 connects common hot wire 348 with one of the normally open contacts of the tape control limit switch LST-2 and wire 571 connects the other contacts of switch LST-2 with one of the normally open contacts R3-5 of the switching relay R3. Wire 572 connects the other contact R3-5 with the normally open contacts R13-4 of the switching relay R13 and wire 573 connects the other contact R13-4 with one of the normally closed contacts R4-1 of the switching relay R4. Wire 574 connects the other contact R4-1 with one side of solenoid SOL-12 and the other side of solenoid SOL-12 is connected to common ground 351 through wire 575 so that when contacts R13-4 and R3-5 as well as switch LST-2 are closed, solenoid SOL-12 is energized which raises the skate wheel assembly 166 to prevent articles in the turning section T from being turned. Wire 576 connects wire 571 with one side of glow light GL-7 with common ground 351 so that GL-7 is illuminated when switch LST-2 is closed. This portion of the circuit serves to control the skate wheel assembly 166.

Wire 578 connects common hot wire 348 with one of the normally open contacts of the tape control limit switch LST-3 and the wire 579 connects the other contacts R23-3 of the switching relay R23. Wire 580 connects the other contact R23-3 with one of the normally open contacts LS15-3 of the limit switch LS15 and wire 481 connects the other contact LS15-3 with one side of relay coil RC-5B of the switching relay R5. The other side of relay coil RC-5B is connected to common ground 351 through wire 582 so that when switch LST-3 is closed and switch LS15 is closed, relay coil RC-5B will be energized.

Wire 584 connects wire 348 with one of the normally open contacts R23-6 of the switching relay R23 and wire 585 connects the other contact R23-6 with wire 581 so that when contacts R23-6 are closed and limit switch LS15 is closed, the relay coil RC-5B will be energized. Wire 586 connects wire 580 with one side of glow light GL-6 and wire 587 connects the other side of glow light GL-6 with common ground 351 so that when switch LST-3 is closed, the glow light GL-6 will be illuminated. This portion of th4e circuit serves to control the apron assembly A.

Wire 588 connects wire 348 with one of the normally open contacts of the tape control limit switch LST-8 and wire 589 connects the othe contact of switch LST-8 with one side of relay coil RC-12 of the switching relay R12. The ground 351 through wire 590 so that when switch LST-8 is closed, coil RC-12 will be energized. Wire 591 connects common hot wire 348 with one of the normally open contacts of the tape control limit switch LST-6 and the other contact thereof is connected to the contact SS6-1 of the selector switch SS6 while wire 593 connects common hot wire 348 with one of the normally open contacts R12-1 of the switching relay R12. Wire 594 connects the other contact R12-1 with the contact SS6-2 of the selector switch SS6. Wire 595 connects wire 348 with one of the normally open contacts of the tape control limit switch LST-7 and wire 596 connects the other contact thereof with one of the normally open contacts R12-4 of the switching relay R12. The other contact R12-4 is connected to the contact SS6-4 of the selector switch SS6 and wire 598 connects wire 596 with the contact SS6-3 of the selector switch SS6. A wiper arm 599 of the switch SS6 is connected to the common contact SS6-C of the switch SS6 so that any of the contacts SS6-1-4 may be selectively connected with the common contact SS6-C.

Wire 600 connects contact SS6-C with one of the normally open contacts R13-5 of the switching relay R13 and wire 601 connects the other contact R13-5 with one of the normally open contacts R7-5 of the switching relay R7. The other contact R7-5 is connected to one side of relay coil RC-23B of the switching relay R23 through wire 602 and the wire 603 connects the other side of coil RC-23B with common ground 351. Wire 604 connects wire 600 with the normally closed contacts R13-6 of the switching relay R13 and wire 605 connects the other contact R13-6 with the normally open contacts R9-1 of the switching relay R9. The other contact R9-1 is connected to one side relay coil RC-16A of the switching relay R16 through wire 606 and the wire 607 connects the other side of relay coil RC-16A with common ground 351.

Wire 608 connects one of the normally open contacts of push-button switch PB15 with common hot wire 348 and wire 609 connects the other contact of the push-button switch PB15 with wire 606 so that the control circuitry effected through selector switch SS6 can be bypassed through push-button switch PB15 to energize coil RC-16A. This portion of the circuit controls the number of layers that will be stacked on a particular pallet.

Wire 610 connects wire 348 with one of the normally open contacts PB14-4 of the push-button switch PB14 and wire 611 connects the other contact PB14-4 with a wire 612 connecting one of the normally open contacts R16-4 of the switching relay R16 with one side of relay coil RC-22A of the switching relay R22. Wire 613 connects the common hot wire 348 with the other contact R16-4 and wire 614 connects the other side of relay coil RC-22A with the common ground 351 so that the relay coil RC-22A may be selectively energized either by closing contacts R16-4 or by closing push-button switch PB14. This portion of the circuit serves to control the machine reset condition to cause the machine to reset.

Wire 615 connects wire 348 with one of the normally closed contacts R24-1 of the switching relay R24 and wire 616 connects the other contact R24-1 with one side of coil RC-22B of the switching relay R22B. The other side of relay coil RC-22B is connected to wire 351 through wire 617 so that coil RC-22B is normally energized. This portion of the circuit serves to control the resetting of the tape in the tape control device N.

Wire 618 connects wire 348 with one of the normally open contacts M1U4 of the control M1U-4 with one side of relay coil RC-2A of switching relay R2A. The other side of relay coil RC-2A with the wire 351 through wire 620 so that coil RC-2A is energized while the main elevator E is moving upwardly. This portion of the circuit serves to control the upward movement of the elevator E and the feed chains 86 and 95.

Wire 622 connects wire 348 with one of the normally open contacts of foot operated switch FOS and the other contact thereof is connected to wire 389 through wire 621. This provides a manual override to energize solenoid SOL-1 to retract pallet retainers 52 and 54.

OPERATION

To start operation of the machine it is necessary to close the circuit breaker 344 to supply current to the wires 346 and 351. Before automatic operation of the machines can be started, it is necessary to place an empty pallet in the pallet magazine 46 for the pallet elevator 68 to engage and load the main elevator E. This is done by depressing the foot operated switch FOS so as to retract the pallet retainers 52 and 54 and aligning the pallet with the pallet retainers 52 and 54. Switch FOS is then released. This allows the pallet retainers 52 and 54 to extend to engage the empty pallet. After this is done, the pallet magazine 46 is then filled with empty pallets. When the magazine 46 is filled, the switch LS6 is activated so that the pallet elevator 68 may move upwardly to engage the pallet.

After the pallet magazine 46 has been filled, one of the start buttons PB1 or PB2 is depressed to put the machine on automatic operation. When this is done, the pallet elevator 68 progresses upwardly since MC-6U has been energized to start the motor drive unit 81. The elevator 68 continues to move upwardly and contact limit switch LS-19 which retracts the pallet retainers 52 and 54 so as to drop the lowermost pallet onto the pallet elevator 68. Pallet elevator 68 continues to be moved upwardly until switch LS4 is activated to open contacts LS4-1 and de-energize coil MC-6U.

This energizes coil MC-6D since contacts LS4-2 are closed and starts the elevator moving downwardly. As the elevator moves downwardly, switch LS19 is deactivated so as to allow the pallet retainers 52 and 54 to extend and engage the next to the lowermost pallet resting on the pallet elevator 68. The pallet elevator 68 continues to move downwardly until the pallet is deposited on the feed chains 86, thereby closing switch LS21 to close contacts LS21-1 and energize the coil MC-2 to start the motor drive unit 101 to drive the feed chains 86 forwardly. The elevator 68 continues to move downwardly until switch LS4 is deactivated to close contacts LS4-1 and open contacts LS4-2. This stops the downward movement of the elevator 68 and the upward movement thereof is precluded since contacts R2-3 and LS21-3 are now open.

As the pallet is moved forwardly on the feed chains 86, the forward edge thereof activates limit switch LS22 so as to close contacts LS22-1 and activate coil RC-2B to close contacts R2-5. As soon as the pallet clears switches LS22 and LS21, coil RC-15 is energized since contact LS22-1 closes which causes contacts R15-1 to open after a predetermined length of time so as to stop the feed chains 86 and 95. When this is done, an empty pallet is carried on the feed chains 95 and is positioned in the elevator shaft S ready to be picked up on the main elevator E.

As soon as relay R15 transfers the switches therein, the contacts R15-2 are closed to energize coil MC-1U and start the main elevator E moving upwardly. The main elevator E continues to move upwardly with the pallet thereon until contacts LS12U-1 of the up-limit switch LS-12U are opened by the cam limit switch LS12.

When the coil MC-1U is activated, this closes contact M1U-4 to energize coil RC-2A and close contacts R2-3 so that the pallet elevator 68 is again moved upwardly. The pallet elevator 68 receives another empty pallet thereon as described in the aforementioned manner and deposits this pallet on the feed chins 86. This serves to close contacts LS21-1 and move the empty pallet forward on the feed chains 86 until LS21-1 is cleared. This serves to open contacts LS21-1 and stop the feed chains 86 since the contacts LS12U-1 are now open. To prevent the empty pallet from projecting too far out into the elevator shaft S, the front end of the pallet engages the stop plate 105 which is now raised since the main elevator E is in its up position.

When the start button PB1 or PB2 was depressed to place the machine on automatic operation, relay coils MC-5 and MC-6 were energized to start operation of the feed mechanism. Therefore, the machine is now ready to recieve articles to be stacked on a pallet.

Articles are placed on the belt 149 of the infeed belt conveyor C which carries the articles upwardly and deposits them on the rolls 131 of the infeed roll section I. The rolls 131 of the infeed roll section I propel the article from the right to the left as seen in FIG. 1 until the front edge of the article breaks the light beam of the photoelectric switch PE2 which serves to activate the numerical tape control device N housed in the control panel 121.

When this is done, contacts PE2-2 are closed to energize coil RC-13 and close contacts R13-3 to cause coil SRC-1F to be energized and step the control tape in the tape control device N forward one step. When this is done, the interrupter forward switch IFS is opened which causes coil RC-3 to be de-energized and open contacts R3-2 which in turn causes contacts R4-3 to open and prevent the tape from moving forward more than one step. The interrupter switch IFS thereafter closes so that contacts R3-2 are again closed to energize coil RC-4 to prepare the control device N for the next stepping operation.

Assuming that the pattern shown in FIG. 21 of the accompanying drawings is being utilized, it will be seen that only channel 5 of the tape shown in FIG. 23 will be punched at the first step. This corresponds to switch LST-5. This allows for the first article to be turned 90 degrees in the turning section T and proceed across the cross-feed roll section R as shown in FIG. 18.

As the next article proceeds along the infeed roll section I and activates the photoelectric switch PE2, the tape is stepped forward another step in the numerical control device N to determine what is to be done with the article N in the turning section T. Since this article must be handled exactly as the previous article, only channel 5 will be punched in the tape and the article will be turned 90° and transported into the cross-feed roll section R behind the first article.

As a third article breaks the light beam of the photoelectric switch PE2, the tape is again stepped forward one step in the aforementioned manner. Since this article must not be turned 90°, however, channel 2 associated with switch LST-2 is punched so that switch LST-2 is closed. When the contacts of switch LST-2 are closed, the solenoid SOL-12 is energized since contacts R3-5 and contacts R13-4 are normally closed so that the skate wheel assembly 166 is raised. As the third article is moved forwardly by the rolls 131, it is received by the skate wheels 169 rather than the rolls 159 so that the third article is not turned as shown in FIG. 17. When the third article clears photoelectric switch PE-2, the contacts R13-4 are opened which de-energizes solenoid SOL-12 and lowers the skate wheel assembly 166 so that the third article which is now resting on the rolls 159 is moved into the cross-feed roll section R while having its long axis perpendicular to the long axes of the first two articles.

When the fourth article activates photoelectric switch PE-2, the tape is again stepped forward in the aforementioned manner. Since this article must not be turned 90°, channel 2 and channel 5 are punched so that the skate wheel assembly 166 is again raised in the aforementioned manner, so that the fourth article will be transported onto the cross-feed roll section R in parallel relationship with the third article. This completes the first row of the first layer of articles as shown in FIG. 21.

Channel 1 associated with switch LST-1 is also punched in the tape at this position since it is necessary to rake the four articles on the cross-feed roll section R forward onto the apron assembly A. Since switch LST-1 is now closed, coil RC-9D will be activated as soon as the fourth article closes the contacts PE3-1 of the photoelectric switch PE3. This is effective to transfer the switching relay R9 and close contacts R9-5 to energize the relay coil RC-6 as soon as the fourth article clears the photoelectric switch PE3 and closes contacts PE3-2. When coil RC-6 is energized, contacts R6-4 close to cause solenoid SOL-7 to be energized and supply air to the air motor 246 and propel the rake chains 235 and 236 forward and rake the articles from the crossfeed roll section R onto the apron assembly A. The rake mechanism M continues to move until one of the rakes 238 or 240 opens contacts LS15-1 and de-energizes coil RC-6.

As the fifth article activates photoelectric switch PE2, the tape in the tape control device N is stepped forward one step in the aforementioned manner and since it is desirable that the fifth article be turned 90°, only channel 5 of the tape will be punched at this position. The fifth article then, is turned 90° and proceeds to cross the cross-feed roll section R until stopped at the extending end thereof.

The sixth article coming into the machine activates photoelectric switch PE2 which causes the tape to step forward in the aforementioned manner and since it is also desirable that the sixth article be turned 90°, channel 2 will not be punched. However, since it is desirable that the fifth and sixth articles be raked onto the apron assembly A, channel 1 is punched. The fifth and sixth articles are then raked forward by the rake mechanism M onto the apron assembly A behind the first row of articles.

When the first row of articles was raked onto the apron assembly A, the light beam of the photoelectric switch PE4 was broken to close contacts PE4-1 and cause the apron assembly A to close or extend toward the elevator shafts upon energization of solenoid SOL-2. The apron assembly A continues to close until the light beam of photoelectric switch PE4 is again established to stop the closing of the apron assembly A. In like manner, the second row of articles deposited on the apron assembly A will break the light beam of PE-4 to cause the apron assembly A to advance until the light beam of PE-4 is again established. Since the clutch mechanisms 275 associated with the rolls 251 allow rotation only in one direction, articles deposited on the apron assembly A will continue to move forward until they contact the skid plate 250 or a row of articles carried on the skid plate 250 and will not roll rearwardly again.

The seventh and eighth articles are carried onto the cross-feed roll section R after being turned 90° in the turning section T, and the ninth and tenth articles are carried on the cross feed roll section R in an unturned position so that this row of articles is identical to the first row of articles. The third row of articles is raked from the cross-feed roll section R and the fourth row of articles comprised of the eleventh, twelfth, thirteenth and fourteenth articles are deposited on the cross-feed roll section R and raked therefrom as was the first and third row of articles.

It will be noted, however, that since the fourth row of articles completes the first layer of the pallet load, channel 3 associated with switch LST-3 is also punched in the tape at the fourteenth step in the tape to cause the apron assembly A to advance the completed layer into the elevator shaft S.

When switch LST-3 is closed due to the tape being punched in channel 3 in the 14th step of the tape, it will be seen that relay coil RC-5B will be energized when the rake stroke is completed and contacts LS15-3 are closed. When coil RC-5B is energized, contacts R5-6 are closed so as to energize solenoid SOL-2 and cause the apron assembly A to fully close or extend into the elevator shaft S and place the layer of articles on the apron assembly A within the elevator shaft S. When the apron assembly A is fully closed, contacts LS3-2 are closed to energize relay coil RC-10B and close contacts R10-1 which causes solenoid SOL-5 to be energized and activate the compression release mechanism to cause the articles on the apron assembly A to be held within the elevator shaft S by moving the rear compression bar 321, the front compression plate 306 and the side compression plates 330 and 330' toward each other to engage the articles on the apron assembly A. At the same time, relay coil RC-17 is energized and after a predetermined length of time closes contacts R17-2 to energize solenoid SOL-3 and cause the apron assembly A to open or retract from under the articles held by the compression release assembly. The apron assembly A opens until switch LS16 is activated to open contacts LS16-1 and de-energize relay coils RC-5A to transfer contacts R5-5 and R10-1 to de-energize solenoid SOL-3 and SOL-5 to release the articles held by the compression release assembly. This allows the articles thus held to drop down onto the pallet carried by the elevator E.

During the time the apron assembly A is opening, contacts PE1-2 are closed since the light beam associated with photoelectric switch PE1 is broken. Since contacts R10-5 and contacts R1-1 are also closed, coil MC-1D is energized to cause the main elevator E to descend downwardly until light beam of switch PE1 is re-established over the articles thereon to open contacts PE1-2 and de-energize coil MC-1D. This places the main elevator E in position to receive a subsequently formed layer of articles from the apron assembly A.

When the apron assembly A is retracted, it is ready for the receipt of subsequent rows of articles thereon to form another layer. It must also be noted, however, that the second layer placed on the pallet must be stacked as a mirror image of the first layer in order that the layers stacked on the pallet will tend to hold themselves together.

The first and second rows of articles in the second layer are formed by not turning the first two articles of each row and turning the second two articles of each row. Since it is necessary to prevent the third layer of articles from proceeding all the way across the cross-feed roll section R, the channel 4 of the tape is punched at step 23 associated with the first article of the third row in the layer so that switch LST-4 will be closed. This serves to activate solenoid SOL-11 and cause case stop CS3 to be raised. This causes the first article in the third row to be stopped by the case stop CS3 and since channel 4 is also punched in the 24th step, the next article in the third layer will be stopped behind the first article thereon. The machine then rakes these two articles forward into position on the apron assembly A and the fourth row of articles in the second layer is formed as the first and second row of articles.

The apron assembly A then advances forward and drops the second layer of articles onto the first layer of articles. The main elevator E moves down until the light beam associated with the photoelectric switch PE1 is reestablished and the apron assembly A returns to further receive articles in the third layer thereon.

The third layer is a repeat of the first layer; the fourth layer is a repeat of the second layer. The subsequent layers alternate between repeats of the first layer and the second layer.

Assuming that switch arm 599 closes contact SS6-1 and SS6-C of selector SS6, this causes coil RC-23B to be energized when channel 6 associated with switch LST-6 is punched at the 84th step of the tape associated with the last row of articles that is in the sixth layer. When coil RC-23C is energized, it closes contacts R23-1 which in turn energizes relay coil RC-1A. When this is done, contacts R1-2 are closed to energize coil MC-1D which in turn causes the elevator E to descend with the pallet having six layers thereon.

When the elevator E reaches its lowermost limit, it lowers pallet stop 104 and closes contacts LS12D-1 to energize relay coil MC-2 and cause the feed chains S6 and 95 to be moved. This is effective to transfer the filled pallet to the gravity discharge roll section G to discharge the filled pallet from the machine while at the same time forwarding a second empty pallet onto the feed chains 95 to place the empty pallet into position on the main elevator E. After the filled pallet has been discharged from the machine and the empty pallet is in position, the elevator E again ascends with the pallet until the pallet is in position for receiving articles therein.

When relay coil RC-9D is energized through LST-1 on the rake stroke associated with the 84th step in the tape, contacts R9-1 are closed to energize coil RC-16A which in turn transfers contacts R16-4 to a closed position to energize relay coil RC-22A. This serves to energize coil RC24 to switch the reverse stepping circuit into operation and cause the machine to reset itself by stepping rearwardly in a manner as hereinbefore described for the forward stepping portion of the circuit until a position is reached where both channel 5 and channel 4 are not punched. This position is shown as the zero step on the tape illustrated in FIG. 23. The machine is now ready to start a subsequent palletizing operation to stack another pattern the same as the pattern just described on the pallet.

To stack the pattern shown in FIG. 22, the selector switch SS5 is transferred so as to close contacts SS5-2 and SS5-C. This is effective to cause the machine to reset until channel 5 and channel 1 are not punched in the tape. The second pattern is then stacked in a manner similar to the stacking of the first pattern.

Different stack heights may be selected by transferring switch arm 599 of switch SS6 to the appropriate position. In this embodiment of the machine, it will be seen that switch LST-7 is closed for eight layers on a pallet, switch LST-8 is closed for seven layers on a pallet and both switch LST-7 and LST-8 are closed for nine layers on a pallet. It is also to be understood that other stack heights may be achieved by combinations of the switches LST-6-8.

Solenoid SOL-1 is associated with the air valve 59 so as to cause the pallet retainers 52 and 54 to be selectively extended and retracted. Solenoids SOL-2 and SOL-3 are the solenoids associated with air valve 284 and serve to selectively supply air to the air motor 269 to extend or retract the apron assembly A. Solenoid SOL-5 is associated with the air valve 310 and serves to selectively supply air through the air cylinders 308 and 341 to activate the compression assembly P. Solenoid SOL-6 is associated with air valve 145 which is effective to extend or retract case stop CS1. Solenoid SOL-7 is associated with the air valve 249 which serves to selectively supply air to the air motor 246 to advance the rake chains 235 and 236. Solenoid SOL-11 is associated with the air valve 209 and serves to selectively extend and retract case stop CS3. Solenoid SOL-12 is associated with the air valve 178 and serves to selectively supply air to the air cylinder 171 to selectively extend and retract the skate wheel assembly 166.

It will also be noted that appropriate push-button switches are located throughout the circuit to provide for a manual over-ride in the various circuits so that the machine may be selectively manually operated. Push-button switches are provided for manually lowering the main elevator E, for closing or opening the apron assembly A, for activating the compression assembly P, and for resetting the machine. It will be understood that by properly connecting case stops CS2, CS4 and CS5 in the disclosed circuit in appropriate manner, other patterns may be stacked by the machine. It will be understood that other patterns may be stacked using differently punched control tapes.

Each time the machine is on a rake stroke, relay coil RC-8B is energized to transfer contacts R8-1 closed. When the article which activates PE2 clears PE2, this causes solenoid SOL-6 to be energized to raise case stop CS1 and preclude subsequent article on the infeed roll section I from activating PE2. When the coil RC-6 is energized to cause the machine to rake, relay coil RC-8A is energized to open contacts R8-1 to lower case stop CS1 and allow the subsequent articles on the infeed roll section I to proceed forward into the turning section T and the cross-feed roll section R to form subsequent rows of a layer. It will be seen, then, that case stop CS1 serves as a safety device for preventing articles from proceeding into the machine before the rake stroke is proceeding.

It will be apparent to those skilled in the art that, while we have illustrated and described what we consider to be the preferred embodiment of our invention, this embodiment may be varied, parts or elements may be made integral or may be separated into a number of elements or parts, certain parts may be eliminated from the structure and other circuitry and actuating mechanisms may be substituted for the corresponding circuitry and actuating mechanisms and full resort may be had to equivalents without departing from the scope of our invention as defined by the appended claims.

We claim:

1. In a stacking machine, a first continuously operating conveyor for feeding successive articles along a first predetermined path, a second continuously operating conveyor angularly disposed with respect to said first conveyor for receiving from said first conveyor successive articles and for moving said articles away from one side of said first conveyor, means associated with said first conveyor and said second conveyor for turning selected articles through a predetermined angular movement in response to said articles being transferred from said first conveyor to said second conveyor so as to selectively dispose the articles for movement endwise and sidewise along said second conveyor, said means for turning said selected articles through said angular movement including pivot means located adjacent the junction of said first conveyor and said second conveyor and further including skate roller means selectively adjustable between an upper extended position and a lower retracted position operatively associated with said second conveyor whereby said articles can be transferred from said first conveyor onto said skate roller means when said skate roller means is in said upper extended position to prevent an article from being turned and whereby an article is rotated around said pivot means to effect said predetermined angular movement of said article and when said skate roller means is in said lower adjusted position, a rake mechanism for discharging articles sidewise from said second conveyor, an apron assembly disposed adjacent to one side of said second conveyor for receiving articles discharged from said second conveyor, said apron assembly constructed and arranged for selected extension from said second conveyor while still providing support adjacent said second conveyor for receiving articles from said second conveyor, and means for extending and retracting said apron assembly with respect to said second conveyor in response to the number of articles deposited on said apron assembly from said second conveyor, said apron assembly including an apron skid plate selectively disposed adjacent the side of said second conveyor when said apron assembly is retracted for receiving articles discharged from said second conveyor and a plurality of rolls disposed parallel to each other and connected to said skid plate so that said rolls are successively disposed adjacent the side of said second conveyor as said apron assembly is extended to move said apron skid plate away from the side of said second conveyor, said rolls constructed and arranged for free rotation in a first direction so that articles discharged from the side of said second conveyor will move toward said skid plate but are precluded from moving in a second direction so as to preclude movement of articles discharged therefrom back toward said second conveyor.

2. The structure defined in claim 1, including means for compressing a plurality of rows of articles together to form a layer after a predetermined number of articles have been received on said apron assembly and means for withdrawing said apron assembly from beneath said articles for lowering said articles onto a platform disposed therebelow.

3. The structure defined in claim 1, including an elevator for disposing a platform below said apron assembly, and means for raising and progressively lowering said elevator.

* * * * *